(12) United States Patent
Woo et al.

(10) Patent No.: US 12,299,312 B2
(45) Date of Patent: May 13, 2025

(54) ELECTRONIC DEVICE MANAGING DUPLICATE REQUESTS AND METHOD OF OPERATING THE SAME

(71) Applicant: SAMSUNG ELECTRONICS CO., LTD., Suwon-si (KR)

(72) Inventors: Sangoak Woo, Suwon-si (KR); Jaeho Shin, Suwon-si (KR); Hyun Jae Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/535,515

(22) Filed: Dec. 11, 2023

(65) Prior Publication Data

US 2024/0289046 A1   Aug. 29, 2024

(30) Foreign Application Priority Data

Feb. 24, 2023 (KR) .................. 10-2023-0025183

(51) Int. Cl.
*G06F 3/06* (2006.01)
(52) U.S. Cl.
CPC ............ *G06F 3/065* (2013.01); *G06F 3/0622* (2013.01); *G06F 3/0679* (2013.01)
(58) Field of Classification Search
CPC ........ G06F 3/061; G06F 3/065; G06F 3/0622; G06F 3/0604; G06F 12/1027
USPC .......................................................... 711/154
See application file for complete search history.

(56) References Cited

U.S. PATENT DOCUMENTS

| | | | |
|---|---|---|---|
| 9,208,012 B2 * | 12/2015 | Ikegami | ............... G06F 11/0772 |
| 9,208,102 B2 | 12/2015 | Venkumahanti et al. | |
| 10,761,725 B2 | 9/2020 | Palmer | |
| 10,762,000 B2 | 9/2020 | Chang et al. | |
| 10,782,972 B2 | 9/2020 | Grocutt | |
| 11,113,002 B2 | 9/2021 | Spencer | |
| 11,301,370 B2 | 4/2022 | Pasquale et al. | |
| 2009/0158012 A1 * | 6/2009 | Hansen | ............... G06F 9/30032 |
| | | | 712/222 |
| 2015/0253992 A1 * | 9/2015 | Ishiguro | ................ G06F 3/0611 |
| | | | 711/103 |

(Continued)

FOREIGN PATENT DOCUMENTS

JP         2012-63875 A      3/2012

*Primary Examiner* — Than Nguyen
(74) *Attorney, Agent, or Firm* — Sughrue Mion, PLLC

(57) ABSTRACT

An electronic device includes an input handling circuit, a control circuit, and a data transfer circuit. The input handling circuits receives a first request including an address from a first memory device, aligns the address with an access unit of a second memory device, requests a determination for the aligned address, and transmits a second request to the second memory device based on a determination result. The control circuit determines, based on the request, whether a duplicate address with the aligned address is present to generate the determination result and updates a bitmask based on the determination result. The data transfer circuit receives the second request from the second memory device and transfers data based on the bitmask. The bitmask includes one or more bits, each corresponding to the first request and indicating a location corresponding to the first request within an access unit of the second memory device.

20 Claims, 17 Drawing Sheets

(56) References Cited

U.S. PATENT DOCUMENTS

2020/0004662 A1\* 1/2020 Mola ................... G06F 11/3648
2022/0350530 A1\* 11/2022 Yoshida ................ G06F 3/0644

\* cited by examiner

ELECTRONIC DEVICE MANAGING DUPLICATE REQUESTS AND METHOD OF OPERATING THE SAME

CROSS-REFERENCE TO RELATED APPLICATION

This application claims priority to Korean Patent Application No. 10-2023-0025183, filed on Feb. 24, 2023, in the Korean Intellectual Property Office, the disclosure of which being incorporated by reference herein in its entirety.

BACKGROUND

The present disclosure relates to an electronic device managing duplicate requests and a method of operating the same.

In a tiered memory structure, a data request unit of an upper memory and a data access unit of a lower memory may be different from each other. For example, when a tiered memory is implemented as a compute express link (CXL), an upper memory requests 64 bytes of data, but a lower memory may have a data access unit larger than 64 bytes depending on the type thereof. For example, when the lower memory is a non-volatile dual in-line memory module (NVDIMM), the access unit may be 2 kilobytes (KB). In addition, when the lower memory is a NAND flash memory, the access unit may be 4 KB.

Since such a difference in data units causes an increase in the number of accesses to the lower memory, performance of an overall memory system may be deteriorated and power consumption of the memory system may be increased. For example, when the lower memory is a NAND flash memory, the lower memory may return 4 KB of data to the upper memory for every 64-byte request.

SUMMARY

It is an aspect to provide an electronic device managing duplicate requests and a method of operating the same.

According to an aspect of one or more example embodiments, there is provided an electronic device comprising an input handling circuit configured to receive a first request including an address from a first memory device, to align the address with an access unit of a second memory device to generate an aligned address, to request a determination for the aligned address, and to transmit a second request to the second memory device based on a determination result; a control circuit configured to determine, based on the request, whether a duplicate address that is a duplicate with the aligned address is present to generate the determination result and to update a bitmask based on the determination result; and a data transfer circuit configured to receive data corresponding to the second request from the second memory device and to transfer the data based on the bitmask, wherein the bitmask comprises one or more bits, each corresponding to the first request and indicating a location corresponding to the first request within an access unit of the second memory device.

According to another aspect of one or more example embodiments, there is provided a method of operating an electronic device, the method comprising receiving a first request comprising an address from a first memory device; transmitting a second request to a second memory device when a duplicate address, which is a duplicate with an aligned address generated by aligning the address of the first request with an access unit of the second memory device, is not present; receiving data corresponding to the second request from the second memory device; and transmitting the data based on a bitmask that is updated depending on whether the duplicate address is present, wherein the bitmask comprises one or more bits, each corresponding to the first request and indicating a location corresponding to the first request within an access unit of the second memory device.

According to yet another aspect of one or more example embodiments, there is provided an electronic device comprising a memory configured to store at least one instruction; and at least one processor configured to access the memory and execute the at least one instruction to at least receive a first request comprising an address from a first memory device; transmit a second request to a second memory device when a duplicate address, which is a duplicate with an aligned address generated by aligning the address of the first request with an access unit of a second memory device, is not present; receive data corresponding to the second request from the second memory device; and transmit the data based on a bitmask that is updated depending on whether the duplicate address is present, wherein the bitmask comprises one or more bits, each corresponding to the first request and indicating a location corresponding to the first request within an access unit of the second memory device.

BRIEF DESCRIPTION OF DRAWINGS

The above and other aspects will be more clearly understood from the following detailed description, taken in conjunction with the accompanying drawings, in which.

DETAILED DESCRIPTION

Hereinafter, various example embodiments will be described with reference to the accompanying drawings.

Figure 1:
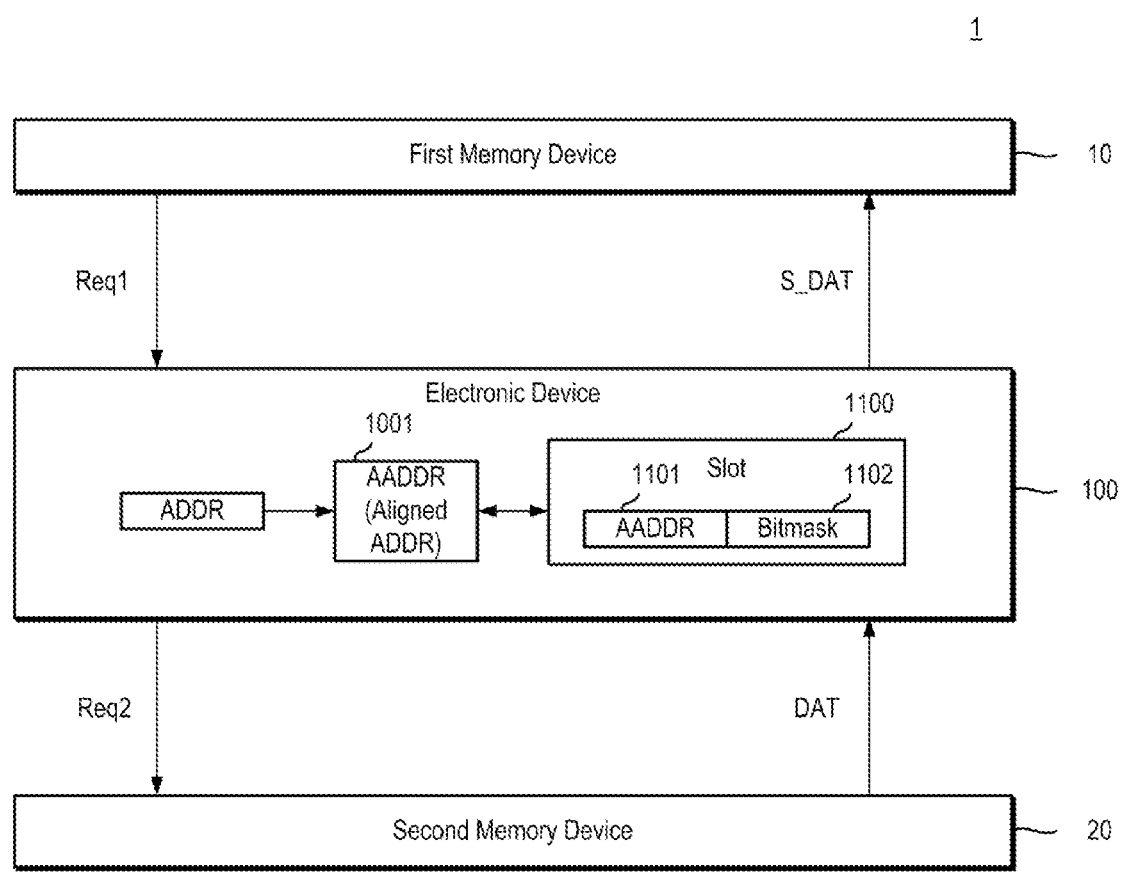
FIG. 1 is a diagram illustrating a memory system according to some example embodiments.

FIG. 1 is a diagram illustrating a memory system according to some example embodiments.

Referring to FIG. 1, a memory system 1 may include a first memory device 10, an electronic device 100, and a second memory device 20. For example, the memory system 1 may be a tiered memory. For example, the memory system 1 may be implemented based on Linux Inter-Process Communication (IPC), Peripheral Component Interconnect Express (PCIe), NVMe-overfabric (NVME-oF), Compute Express Link (CXL) Ethernet, Transmission Control Protocol/Internet Protocol (TCP/IP), Direct Memory Access (DMA), Remote DMA (RDMA), RDMA over Converged Ethernet (ROCE), FiberChannel, or iniBand, or at least a portion of any types of communication interface or protocol including any combinations thereof.

In a tiered memory, the first memory device 10 may be defined as an upper memory disposed in an upper layer and the second memory 20 may be defined as a lower memory disposed in a lower layer in terms of the electronic device 100.

In some example embodiments, the first memory device 10 may be a host device.

In some example embodiments, the second memory device 20 may be a storage device. For example, in some example embodiments, the second memory device 20 may be a solid-state drive (SSD), a universal flash storage (UFS), or an embedded multimedia card (eMMC). In some example embodiments, the second memory device 20 may be implemented as a secure digital (SD) card, a micro SD card, a memory stick, a chip card, a universal serial bus (USB) card, a smart card, a compact flash (CF) card, or the like, but example embodiments are not limited thereto.

In some example embodiments, the second memory device 20 may be implemented as 3.5 inch, 2.5 inch, 1.8 inch, M.2, U.2, U.3, enterprise and data center SSD form factor (EDSFF), new form factor 1 (NF1), and/or a form factor similar thereto.

In some example embodiments, the second memory device 20 may be implemented as a small computer system interface (SATA), a small computer system interface (SCSI), a serial attached SCSI (SAS), and/or an interface similar thereto, and may be implemented as a peripheral component interconnect (PCI), PCI express (PCIe), nonvolatile memory express (NVMe), NVMe-over-Fabrics (NVMe-oF), Ethernet, InfiniBand, Fiber Channel, and/or a protocol similar thereto.

The electronic device 100 may receive a first request Req1 from the first memory device 10, and may transmit a second request Req2 corresponding to the first request Req1 to the second memory device 20. For ease of description, a request transmitted from an upper memory to the electronic device 100 will be referred as the first request Req1, and a request transmitted from the electronic device 100 to a lower memory will be referred to as the second request Req2.

According to a communication interface or protocol implementing the above-described memory system 1, a data width of the first request Req1 or a data width of the second memory device 20 processing the second request Req2 may not match each other. For example, a size of the first request Req1 requested to the second memory device 20 through the first memory device 10 and a data access unit, in which the second request Req2 is processed in the second memory device 20, may be different from each other.

The electronic device 100 may align addresses ADDR, included in the first request Req1, according to a data access unit of the second memory device 20 when receiving the first request Req1. The electronic device 100 may obtain an address 1001 aligned based on the address alignment. The aligned address 1001 may be included in the second request Req2.

In some example embodiments, the electronic device 100 may manage a slot 1100 for one or more first requests Req1. For example, the electronic device 100 may generate and manage one or more slots 1100 according to the first request Req1. For example, an index may be allocated to the slot 1100. The electronic device 100 may compare the aligned address 1001, obtained from the received first request Req1, with the aligned address, included in the managed slot 1100, to determine whether a duplicate address is present. For example, the electronic device 100 may manage the slot 1100 through additional registers such as miss status holding registers (MSHR).

When it is determined that a duplicate address is present, the electronic device 100 may determine the presence of the duplicate address to be a "hit." When it is determined that a duplicate address is absent, the electronic device 100 may determine the absence of the duplicate address to be a "miss." In this case, the "hit" indicates presence of duplicate requests, whereas the "miss" indicates absence of duplicate requests. The term "duplicate requests" may be defined as requests having the same aligned address.

The electronic device 100 may manage a bitmask 1102, included in the slot 1100, based on a result of the determination. The bitmask 1102 may be defined as information for writing a location (or an offset) corresponding to the first request Req1 within an access unit of the second memory device 20. In consideration of a size of the first request Req1 and a data access unit of the second memory device 20 which do not match each other, the bitmask 1102 may include one or more bits, each corresponding to the first request Req1 and indicating a location corresponding to the first request Req1 within the access unit of the second memory device 20. Each of the one or more bits may be updated to a specific logical state (for example, '0' or '1') after the corresponding first request Req1 is received.

For example, the bitmask 1102 may include one or more bits corresponding to the number of values obtained by the data access unit of the second memory device 20 by the size of the first request Req1. For example, when the size of the first request Req1 is 64 bytes (64B) and the data access unit of the second memory device 20 is 256 bytes (256B), the bitmask 1102 may include 4 bits.

Each of the one or more bits may indicate a location corresponding to the first request Reg. The electronic device 100 may identify a location of data, requested by a single first request Req1, in the data received from the second memory device 20 by referencing a single bit, corresponding to the received first request Req1, among the one or more bits included in the bitmask 102.

The electronic device 100 may transmit the second request Req2 to the second memory device 20 based on a hit/miss determination result. For example, the electronic device 100 does not additionally transmit the second request Req2 when a "hit" occurs, but may transmit the second request Req2 when a "miss" occurs.

The second memory device 20 may perform a data processing operation, such as a write or read operation, based on the aligned address 1001 included in the second request Req2 when receiving the second request Req2. The second memory device 20 may transmit data DAT, corresponding to the aligned address 1001, to the electronic device 100.

The electronic device 100 may receive the data DAT from the second memory device 20 and may select data to be transmitted to the first memory device 10, among the received data DAT. In some example embodiments, the electronic device 100 may identify the bitmask 1102, included in the slot 1100, to select selection data S_DAT. The electronic device 100 may transmit the selection data S_DAT to the first memory device 10. For example, the electronic device 100 may identify one or more marking bits corresponding to a specific logical state (for example, '0' or '1') in one or more bits, and may transmit to the first memory device 10 only selection data S_DAT corresponding to the one or more marking bits.

According to some example embodiments, when a request data unit of an upper memory and a data access unit of a lower memory are different from each other, duplicate requests which may be generated for the lower memory may be determined based on the bitmask and data may be processed based on a result of the determination. For example, when data of a larger access unit is received from the second memory device 20 that is the lower memory, the bitmask 1102 may be identified to write or read the data even if the duplicate requests are requested to the lower memory. As a result, the number of accesses to data of the lower memory according to the duplicate requests may be decreased to prevent deterioration of performance of the memory system 1 and an increase in power consumption.

Figure 2:
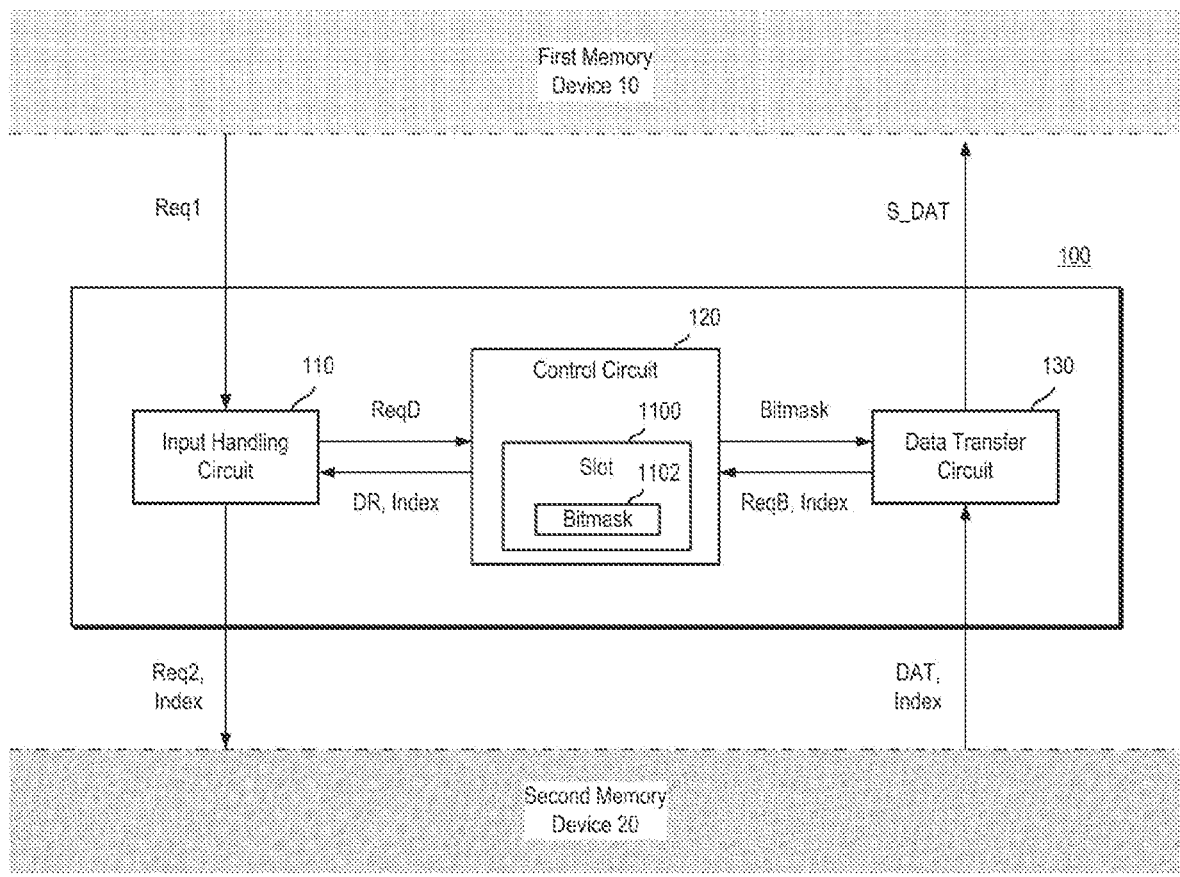
FIG. 2 is a diagram illustrating an electronic device according to some example embodiments.

FIG. 2 is a diagram illustrating an electronic device according to some example embodiments.

Referring to FIG. 2, an electronic device may include an input handling circuit 110, a control circuit 120, and a data transfer circuit 130.

The input handling circuit 110 may receive a first request Req1 including an address from a first memory device 10 and may transmit a second request Req2 to a second memory device 20 depending on whether the first request Req1 is a duplicate. As an example, the input handling circuit 110 may manage a queue in a first-in-first-out (FIFO) scheme to handle the first request Req1. The input handling circuit 110 may sequentially handle first requests Req1, stored in a queue, in the FIFO scheme.

The input handling circuit 110 may align the address, included in the first request Req1, with an access unit of the second memory device 20 to generate an aligned address. For example, the aligned address may have a size aligned with a size of a storage unit (for example, a page, or the like) of the second memory device 20 when a read or write request for the second memory device 20 is executed.

The input handling circuit 110 may transmit a hit/miss determination request ReqD for the aligned address to the control circuit 120.

The input handling circuit 110 may receive a determination result DR and an index of a slot from the control circuit 120. When the determination result is "hit," the input handling circuit 110 may terminate an activity for the first request Req1 corresponding to the determination result DR.

According to some example embodiments, when the determination result DR is "miss," the input handing circuit 110 may transmit the second request Req2 and the index of the slot to the second memory device 20 and may terminate an activity for the first request corresponding to the determination result DR. The index of the slot may be information, such as a type of tag, allowing the data transfer circuit 130 to identify data when the data transfer circuit 130 receives data corresponding to the first request Req1 later. When the second memory device 20 and the data transfer circuit 130 do not sequentially return a plurality of pieces of data on a plurality of requests later, the data transfer circuit 130 and the first memory device 10 may not understand which request the corresponding return is for. In some example embodiments, when the index of the slot is utilized as a tag, the data transfer circuit 130 and the first memory device 10, which are subjects receiving a return, may recognize the return through the tag even if returns for a plurality of requested requests are not sequentially executed. When the index of the slot is utilized as a tag, a value for an additional tag does not need to be generated. Therefore, hardware may be simplified.

The second request Req2 may include an aligned address.

In some example embodiments, the input handling circuit 110 may calculate an offset indicating a location corresponding to the first request Req1 received within a storage unit of the second memory device 20. The input handling circuit 110 may transmit the calculated offset together when transmitting a hit/miss determination request ReqD for the aligned address to the control circuit 120. The offset may be used to indicate a location corresponding the first request Req1 within a bitmask.

In some example embodiments, the control circuit 120 may receive the hit/miss determination request ReqD, together with the aligned address, from the input handing circuit 110. In some example embodiments, the control circuit 120 may receive the offset together with the aligned address. The control circuit 120 may determine whether an address, which is a duplicate with the aligned address received from the input handing circuit 110, is present, based on the hit/miss determination request ReqD. For example, when the aligned address is present, the control circuit 120 may determine that a "hit" occurs. When the aligned address is not present, the control circuit 120 may determine that a "miss" occurs. The control circuit 120 may generate a determination result DR including a "hit" or a "miss," and may transmit the determination result DR to the input handling circuit 110.

The control circuit 120 may manage the bitmask based on the determination result DR. In some example embodiments, the control circuit 120 may allocate a new slot to the first request Req1 when the request result DR indicates that a "miss" occurs. The new slot may also include a bitmask and, among one or more bits included in the bitmask, a single bit corresponding to the first request Req1 may be updated.

In some example embodiments, when the determination result DR indicates that a "hit" occurs, the control circuit 120 may check whether, among one or more bits included in the slot, a single bit corresponding to the first request Req1 is available. When the single bit is available, the single bit may be updated.

The data transfer circuit 130 may receive data corresponding to the first request Reg1 from the second memory device 20. When receiving the second request Req2 and the index of the slot from the input handling circuit 110, the second memory device 20 may perform an operation requested by the second request Req2 (for example, a write operation, a read operation, or the like) on the aligned address included in the second request Req2. When the requested operation is a read operation, the second memory device 20 may read data DAT corresponding to the first request Req1 according to the second request Req2 and may transmit the read data DAT to the data transfer circuit 130.

According to some example embodiments, when the data transfer circuit 130 receives only the data DAT corresponding to the first request Req1 and does not receive the index of the slot transmitted to the second memory device 20 together with the second request Req2, the data transfer circuit 130 may wait until reception of the index of the slot. In some example embodiments, the data transfer circuit 130 may request the index of the slot to be retransmitted.

The data transfer circuit 130 may transfer a bitmask request ReqB to the control circuit 120 when receiving data and the index of the slot. In this case, the index of the slot may be transferred together with the bitmask request ReqB. The control circuit 120 may identify a slot corresponding to the data based on the index of the slot when receiving the bitmask request ReqB from the data transfer circuit 130. The control circuit 120 may transmit a bitmask included in the identified slot and a request identifier, i.e., an identifier allocated to the first request Req1, to the data transfer circuit 130.

The data transfer circuit 130 may transfer data based on the received bitmask. In some example embodiments, the data transfer circuit 130 may identify one or more marking bits having a specific logical state, among one or more bits included in the bitmask, and may transfer the request identifier to the first memory device 10 together with one or more pieces of data, corresponding to the one or more marking bits, among the data.

Figure 3:
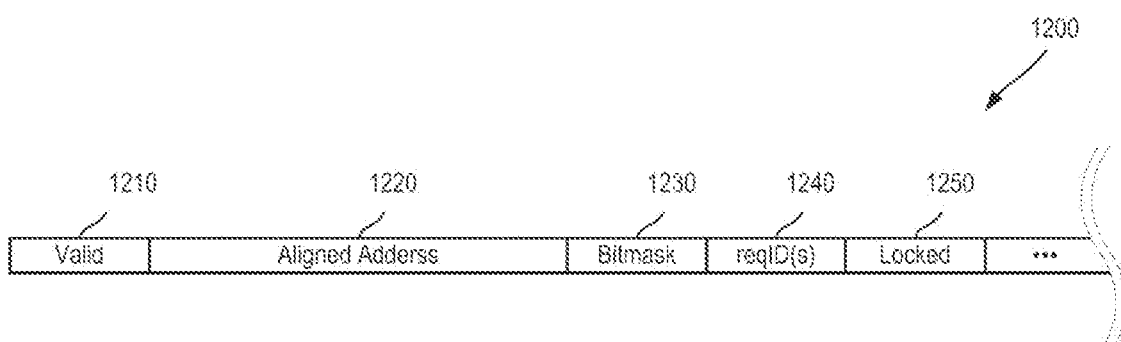
FIG. 3 is a diagram illustrating a slot according to some example embodiments.

FIG. 3 is a diagram illustrating a slot according to some example embodiments.

Referring to FIG. 3, a slot 1200 may be defined as a physical resource which both the input handling circuit 110 and the control circuit 120 may access. The slot 1200 may include a valid field 1210, an aligned address field 1220, a bitmask 1230, a request identifier field (reqIDs) 1240, and a locked field 1250.

The valid field 1210 may indicate whether the slot 1200 is available. The aligned address field 1220 may indicate an address in which an address included in the first request Req1 is aligned. The bitmask field 1230 may indicate a bitmask. The request identifier field 1240 may indicate a request identifier allocated to the first request Req1. The request identifier field 1240 may indicate all request identifiers of a plurality of first requests Req1 having the same aligned address. The locked field 1250 may indicate whether the slot 1200 is locked. When the locked field indicates that the field 1250 is locked, an update operation on the slot 1200 may be blocked.

The slot 1200 may be allocated, deallocated, or updated according to various embodiments. In some example embodiments, the slot 1200 may be newly allocated when a determination result indicates that a "miss" occurs. In some example embodiments, among allocated slots 1200, at least one slot 1200 may be deallocated when an available slot 1200 is not present in the input handling circuit 110 and the control circuit 120. In some example embodiments, the slot 1200 may be updated when a field value of at least one of the valid field 1210, the aligned address field 1220, the bitmask field 1230, the request identifier field 1240, and the locked field 1250 is changed.

For example, the aligned address field 1220 may be updated when slot 1200 is newly allocated.

For example, the valid field 1210 may be updated to indicate valid when the slot 1200 is newly allocated, and may be updated to indicate invalid when transmission of data corresponding to the slot 1200 is completed. The valid field 1210 may be updated to invalid when the slot 1200 is deallocated.

For example, the bitmask field 1230 and the request identifier field 1240 may be updated when a new first request Req1 is processed.

For example, the locked field 1250 may indicate "FALSE" indicating that the slot 1200 is not locked or "TRUE" indicating that the slot 1200 is locked. The input handling circuit 110 or the control circuit 120 may perform operations by accessing the slot 1200 when the locked field 1250 is "FALSE," and may update the slot 1200 to "TRUE" when the operation is completed. Updating the corresponding slot 1200 may be allowed when the locked field 1250 is "FALSE," but may be blocked when the locked field 1250 is "TRUE."

Figure 4:
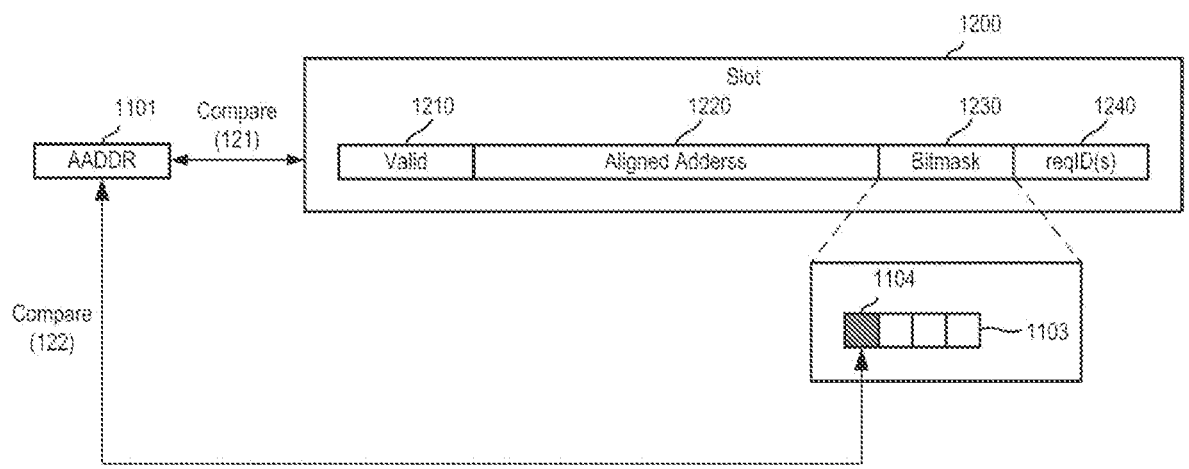
FIG. 4 is a diagram illustrating a bitmask management operation according to some example embodiments.

FIG. 4 is a diagram illustrating a bitmask management operation according to some example embodiments.

Referring to FIG. 4, to determine duplicate requests, the control circuit 120 may determine whether an address, which is a duplicate with the aligned address 1101 received from the input handling circuit 110, is present. The control circuit 120 may compare the aligned addresses 1101 with the aligned address field 1220 included in all slots 1200 (Compare 121). As a result of comparison, even in the case in which only one address is the same, the control circuit 120 may determine that a "hit" occurs. In the other cases except for the "hit" case, the control circuit 120 may determine that a "miss" occurs.

When the determination result is that a "miss" occurs, the control circuit 120 may allocate a new slot for the first request Req1 and may update a valid field, a bitmask field, and a request identifier field that are included in the new slot.

When the determination result is that a "hit" occurs, the control circuit 120 may identify an index of a slot 1200 corresponding to the first request Req1. When the corresponding slot 1200 is identified through an index, the control circuit 120 may identify a bitmask of the slot 1200. The control circuit 120 may identify a single bit 1104 corresponding to the first request Req1 in one or more bits included in the bitmask, and may identify whether the single bit 1104 is available. When the single bit 1104 is available, the control circuit 120 may update the single bit 1104, the valid field 1210, and the request identifier field 1240.

When the single bit 1140 is not available, the control circuit 120 may allocate a new slot to the first request Req1. The control circuit 120 may update a valid field 1210, a bitmask field 1230, and a request identifier field 1240 that are included in the new slot.

For example, depending on a logical state of the single bit 1104, it may be determined whether the single bit 1104 is available. For example, when the logical state of the single bit 1104 is '1' (or '0'), the single bit 1104 may be defined as being available. On the other hand, when the logical state of the single bit 1104 is '0' (or '1'), the single bit 1104 may be defined as being not available.

Figure 5:
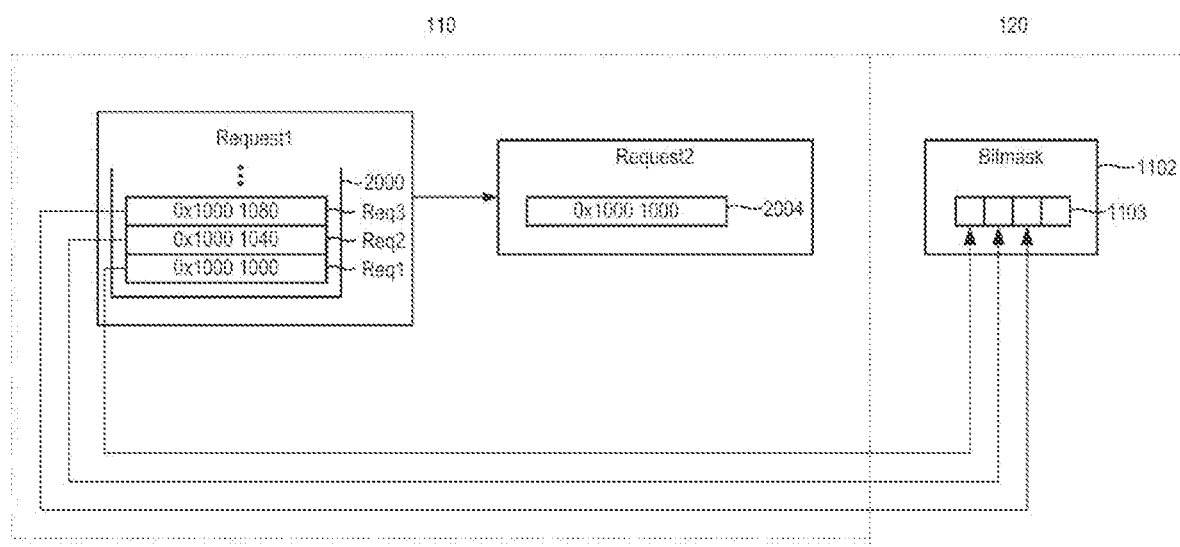
FIG. 5 is a diagram illustrating a bitmask update operation according to some example embodiments.

FIG. 5 is a diagram illustrating a bitmask update operation according to some example embodiments.

Referring to FIG. 5, the input handling circuit 110 may receive one or more first requests from the first memory device 10. As an example, for ease of description, only three first requests Req1, Req2, and Req3 and only an address among a plurality of pieces of information included in each first request are illustrated in FIG. 5, but example embodiments are not limited thereto.

The input handling circuit 110 may receive one or more first requests based on a queue 2000 in, for example, a FIFO scheme. The input handling circuit 110 may align the one or more first requests as an address to be included in the second request Req2. For example, when a request unit of the first memory device 10 is 64B and an access unit of the second memory device 20 is 256B, an address of 8 bits or less from a last bit in an address of each of the one or more first requests may be ignored. For example, in the case of FIG. 5, '00', '40', and '80' in an address of each first request may be ignored. Accordingly, addresses of the one or more first requests may be all aligned as an aligned address 2004. Here, the aligned address 2004 may be '0x1000 1000,'

The second memory device 20, receiving the second request Req2 including the aligned address 2004, may perform a data write or read operation based on the aligned address 2004. However, since all addresses of the one or more first requests have the same aligned address, the second memory device 20 may read and transmit the same 256-byte data to the data transfer circuit 130 even when any first request is received in terms of the second memory device 20.

Accordingly, the control circuit 120 may manage a bitmask 1102 to prevent an access to data of the second memory device 20 and transmission of duplicate data of the first memory device 10, caused by duplicate requests. In some example embodiments, the control circuit 20 may determine whether the first request is "hit" or "miss," based on the aligned address. It will be assumed that the one or more requests are all new requests and are not duplicate within 256 bytes. Since a 1-1-th request Req1 is a first request in a FIFO scheme, the control circuit 120 may determine that the 1-1-th request Req1 is "miss" and may allocate a new slot and a new bitmask. As described above, the bitmask 1102 may include one or more bits 1103. In FIG. 5, since a request unit of the first request is 64B and an access unit of the second memory device 20 is 256B, the number of the one or more bits 1103 may be four.

When the bitmask 1102 manages a first request from a most significant bit (MSB), the control circuit 120 may update a logical state of an MSB corresponding to the 1-1-th request Requ1 in the one or more bits 1103.

Since both a 1-2-th request Req2 and a 1-3-th request Req3 received thereafter have the same aligned address as the 1-1-th request Req1, the control circuit 120 may determine that the 1-2-th request Req2 and the 1-3-th request Req3 are hit and may update logical states of a second bit and a third bit from the MSB in the bitmask 1102. When logic '1' of the bitmask 1102 indicates a processed request, the bitmask of FIG. 5 may be finally updated to '1110.'

Figure 6:
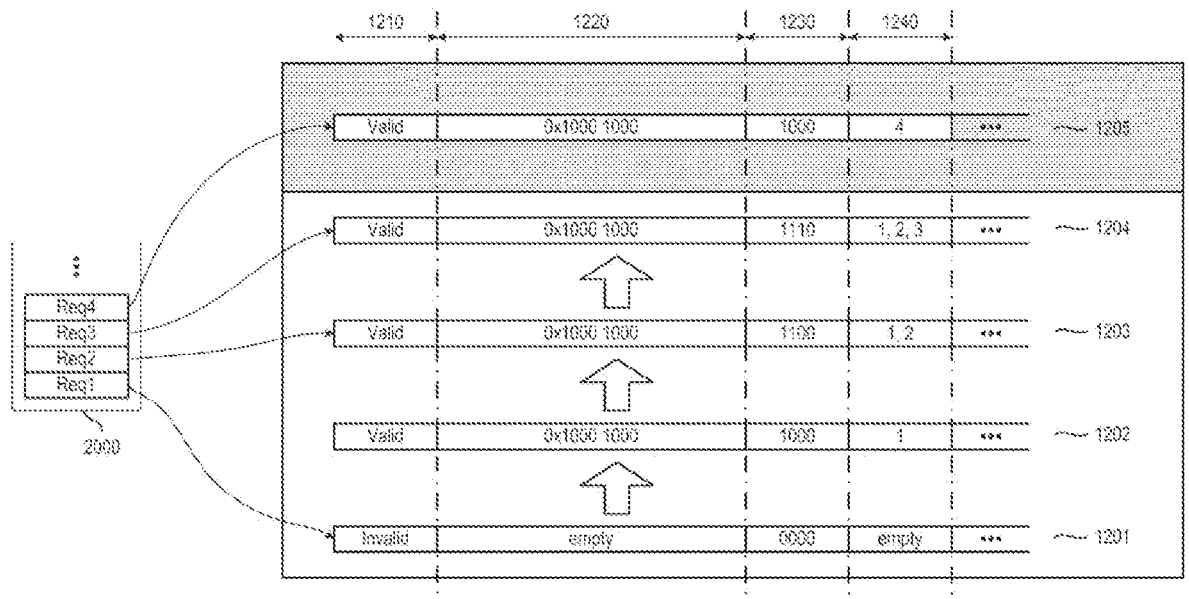
FIG. 6 is a diagram illustrating a slot update operation according to some example embodiments.

FIG. 6 is a diagram illustrating a slot update operation according to some example embodiments.

Referring to FIG. 6, similarly to FIG. 5, it will be assumed that a request unit of a first request is 64B and an access unit of the second memory device 20 is 256B. In addition, it will be assumed that a 1-1-th request Req1 to a 1-3-th request Req3 are requests for data on first, second, and third offsets, respectively, and a 1-4-th request Req4 is a request for data on an offset duplicate with a first request.

The input handling circuit 110 may generate an aligned address from one or more first requests stored in a queue 2000 in a FIFO scheme. The input handling circuit 110 may sequentially transmit requests for determination of the one or more first requests to the control circuit 120.

The control circuit 120, receiving the 1-1-th request Req1, may determine that the 1-1-th request Req1 is "miss" and may allocate a new slot 1201. In the new slot 1201, both an aligned address field 1220 and a request identifier field 1240 indicate empty, a valid field 1210 may indicate invalid, and a bitmask field 1230 may indicate '0000' indicating that the first requests are not all processed.

The allocated new slot 1201 may be immediately updated based on information of the 1-1-th request Req1. As an example, in an updated slot 1202, a valid field 1210 may be updated to valid, an aligned address field 1220 may be updated to '0x1000 1000', which is an aligned address, a bitmask field 1230 may be updated to '1000' since a value corresponding to a location of the 1-1-th request Req1 is updated to '1,' and a request identifier field 1240 may be updated to '1,' which is an identifier of the 1-1-th request Req1. A value of each field is merely exemplary.

Then, when the 1-2-th request Req2 is processed, the slot 1202 may be updated. Since the 1-2-th request Req2 is a request for the second offset, the bitmask field 1230 in the updated slot 1203 may be updated to '1100,' and the request identifier field 1240 in the updated slot 1203 may be updated to '1, 2' to which '2', which is an identifier of the 1-2-th request Req2, is added.

Then, when the 1-3-th request Req3 stored in the queue 2000 is processed, the slot 1203 may be updated. Since the 1-3-th request Req3 is a request for the third offset, a bitmask field 1230 in the updated slot 1204 may be updated to '1110,' and a request identifier field 1240 in the updated slot 1204 may be updated to '1, 2, 3' to which '3', which an identifier of the 1-3-th request Req3, is updated.

Then, the 1-4-th request Req4 stored in the queue 2000 is a request duplicate with the 1-1-th request Req1 even if the requests Req4 and Req1 have the same address '0x1000 1000.' In this case, the control circuit 120 may determine that the 1-4-th request Req4 is "miss." Accordingly, a new slot 1205 may be allocated.

The new slot 1205 may be updated from an empty field, similarly to the slot 1201. A bitmask field 1230 included in the new slot 1205 may be updated to '1000' to correspond to the offset of the 1-4-th request Req4, and a request identifier field 1240 included in the new slot 1205 may be updated to '4,' which an identifier of the 1-4-th request Req4.

Figure 7:
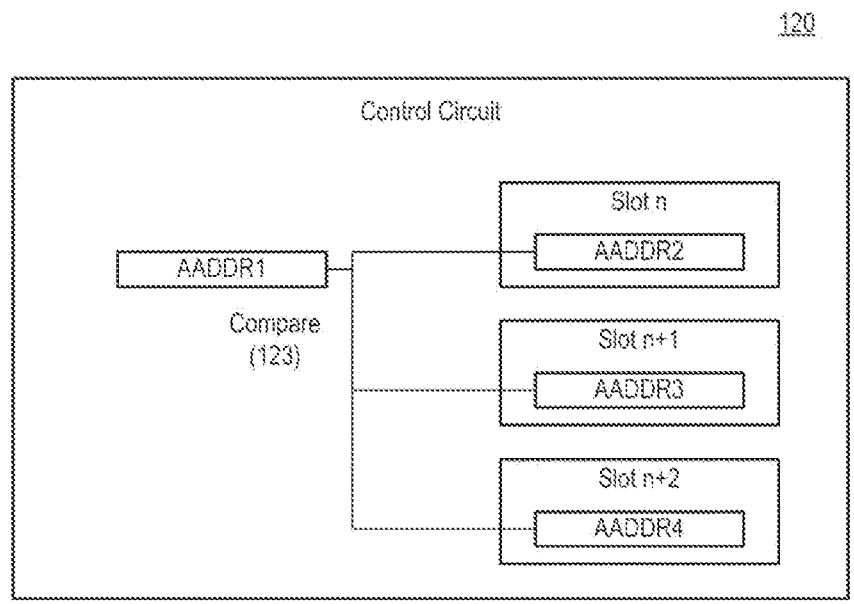
FIGS. 7 and 8 are diagrams illustrating a hit/miss determination operation of a control circuit according to various example embodiments.
Figure 8:
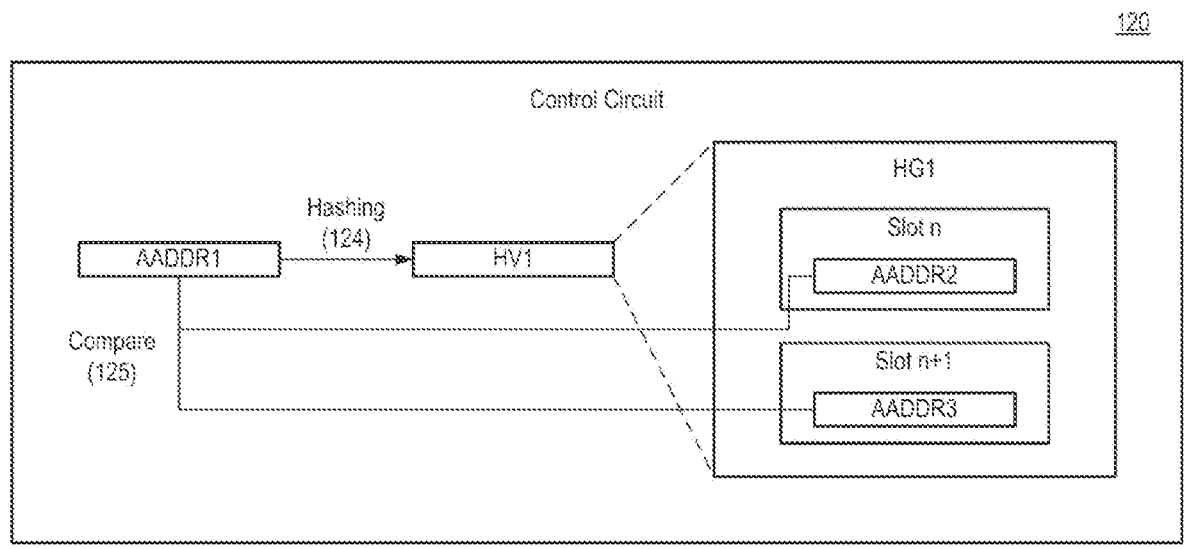

FIGS. 7 and 8 are diagram illustrating a hit/miss determination operation of a control circuit according to various example embodiments.

Referring to FIG. 7, a control circuit may compare an aligned address AADDR1, obtained from a first request Req1, with aligned addresses included in all slots (Compare 123).

For example, the control circuit 120 may compare the aligned address AADDR1 with aligned addresses AADDR2, AADDR3, and AADDR4 included in all currently allocated slots, as an n-th slot, an (n+1)-th slot, and an (n+2)-th slot. In the case in which at least one address is duplicate, the control circuit 120 may determine that a "hit" occurs. In the other cases except for the "hit" case, the control circuit 120 may determine that a "miss" occurs. In the case of a hit/miss determination operation of comparing all aligned addresses, complexity in hardware implementation may be relatively reduced.

Referring to FIG. 8, a control circuit 120 may perform a hashing operation (Hashing 124) on an aligned address AADDR1 and may obtain a hash value HV1. Slots having the same hash value may be included in the same hash group. For example, the hash value HV1 may correspond to a hash group HG1. The control circuit 120 may compare the aligned address AADDR1 with all slots (an n-th slot and an (n+1)-th slot) included in the hash group HG1 corresponding to the obtained hash value HV1 (Compare 125). The control circuit 120 may compare the aligned address AADDR1 with aligned addresses AADDR2 and AADDR3 included in each of all slots in the hash group HG1. In the case in which at least one address is a duplicate, the control circuit 120 may determine that a "hit" occurs. In the other cases except for the "hit" case, the control circuit 120 may determine that a "miss" occurs.

For example, the control circuit 120 may generate a hash value from the aligned address AADDR1, may identify a hash group having the same hash value using the generated hash value as a type of index, and may compare the aligned address AADDR1 with all addresses included in the hash group to obtain a determination result. A high/miss determination operation based on the hash value may be advantageous in increasing a hardware speed in a situation in which more slots are allocated.

Figure 9:
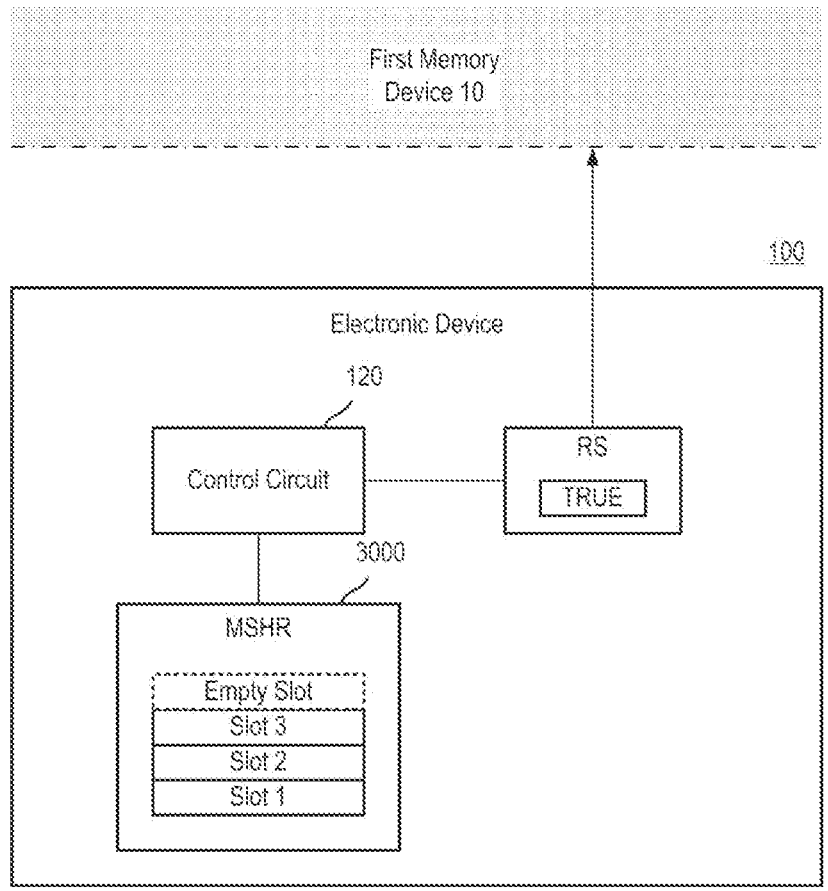
FIG. 9 is a diagram illustrating an operation of generating a ready signal of a control circuit according to various example embodiments.

FIG. 9 is a diagram illustrating an operation of generating a ready signal of a control circuit according to various example embodiments.

In some example embodiments, the control circuit 120 may generate a ready signal RS for notifying the first memory device 10 that the control circuit 120 is ready to receive a first request Req1. The electronic device 100 may transmit the ready signal RS, generated by the control circuit 120, to the first memory device 10. The ready signal RS may correspond to 'TRUE' or 'FALSE.' In the case of 'TRUE,' the first memory device 10 may transmit the first request Req1 to the electronic device 100. In the case of 'FALSE,' the first memory device 10 may suspend the transmission of the first request Req.

Referring to FIG. 9, the control circuit 120 may generate a ready signal RS indicating 'TRUE' when among managed slots, an allocable slot, for example, an empty slot is present in an MSHR 3000. In some example embodiments, the control circuit 120 may generate a ready signal RS indicating 'FALSE' when all slots in the MSHR 3000 are allocated and thus no empty slot is present. In the case of FIG. 9, a first slot to a third slot are being used or are slots in which an empty slot is present, so that the ready signal RS may indicate 'TRUE.'

In some example embodiments, an operation of generating a single ready signal RS based on the MSHR 3000 may be performed when the control circuit 120 determines "hit" and "miss" in a manner of comparing an aligned address with aligned addresses included in all slots.

According to some example embodiments, the control circuit 120 may use only a single ready signal regardless of a hash group. For example, the input handling circuit 110 may have a FIFO queue for processing a request, and the control circuit 120 may generate a ready signal RS indicating 'FALSE' when a corresponding queue is full. In some example embodiments, the control circuit 120 may generate a ready signal RS indicating 'TRUE' when the corresponding queue is not full.

According to the above-described embodiments, the control circuit 120 and the electronic device 100 may generate a ready signal depending on whether slots in the MSHR 3000 are available, and may notify the first memory 10 that it is ready to receive the first request Req1 according to the generated ready signal. When no available slot is present in the electronic device 100, the first memory device 10 may suspend the transmission of the first request Req1 to reduce latency.

Figure 10:
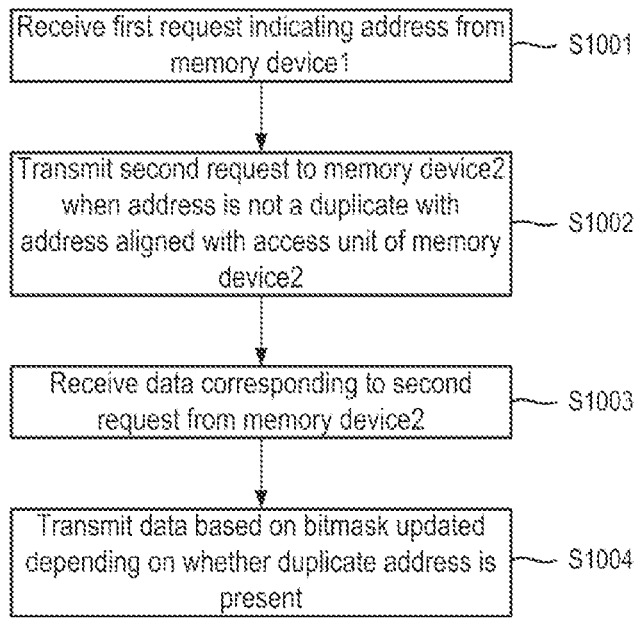
FIG. 10 is a flowchart illustrating a method of operating an electronic device according to some example embodiments.

FIG. 10 is a flowchart illustrating a method of operating an electronic device according to some example embodiments.

Referring to FIG. 10, in operation S1001, the electronic device 100 may receive a first request Req1 including an address from the first memory device 10.

In operation S1002, the electronic device 100 may transmit a second request Req2 to the second memory device 20 when the address included in the first request Req1 is not a duplicate with an address aligned with an access unit of the second memory device. For example, when a result of determination is "miss" indicating that no duplicate address is present, a flow may proceed to operation S1002 of transmitting the second request Req2.

In operation S1003, the electronic device 100 may receive data corresponding to the second request Req2 from the second memory device 20. When the access unit of the second memory device 20 is larger than a request unit of the first request Req1, the received data may also be larger than the request unit of the first request Req1.

In operation S1004, the electronic device 100 may transmit data based on a bitmask updated depending on whether a duplicate address is present. The bitmask may include one or more bits, each corresponding to the first request Req1 and indicating a location of the first request Req1 within the access unit of the second memory device 20. Accordingly, the electronic device 100 may identify the bitmask and the one or more bits and may select selection data S_DAT corresponding to one or more marking bits having a specific logic state, among the one or more bits. The electronic device 100 may transmit the selection data S_DAT, selected from data, to the first memory device 10.

Figure 11:
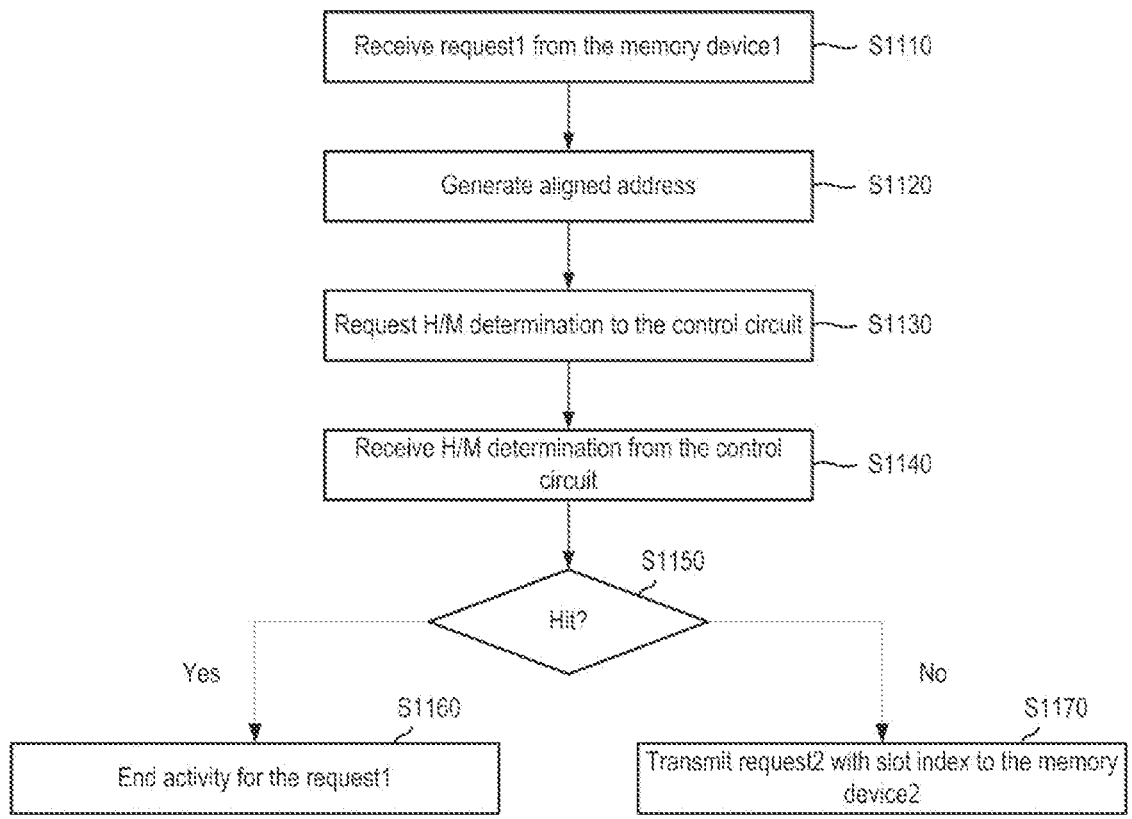
FIG. 11 is a flowchart of a method of operating an input handling circuit according to some example embodiments.

FIG. 11 is a flowchart of a method of operating an input handling circuit according to some example embodiments.

Referring to FIG. 11, in operation S1110, the input handling circuit 110 may receive a first request Req1 from the first memory device 10.

In operation S1120, the input handling circuit 110 may align the address included in the first request Req1 with the access unit of the second memory to generate an aligned address. The input handling circuit 110 may calculate an offset indicating a location corresponding to the first request Req1.

In operation S1130, the input handling circuit 110 may request the control circuit 120 to determine a "hit" or a "miss." During the request for the hit/miss determination, the input handling circuit 110 may transmit the aligned address and/or the calculated offset.

In operation S1140, the input handling circuit 110 may receive a result of the hit/miss determination from the control circuit 120. In operation S1150, the input handling circuit 110 may determine whether the received result is a "hit."

In operation S1160, when a "hit" occurs (operation S1160, Yes), the input handling circuit 110 may end an activity for the first request Req1. In operation S1170, when a "miss" occurs (operation S1160, NO), the input handling circuit 110 may transmit the second request Req2, together with a slot index, to the second memory device 20.

Figure 12:
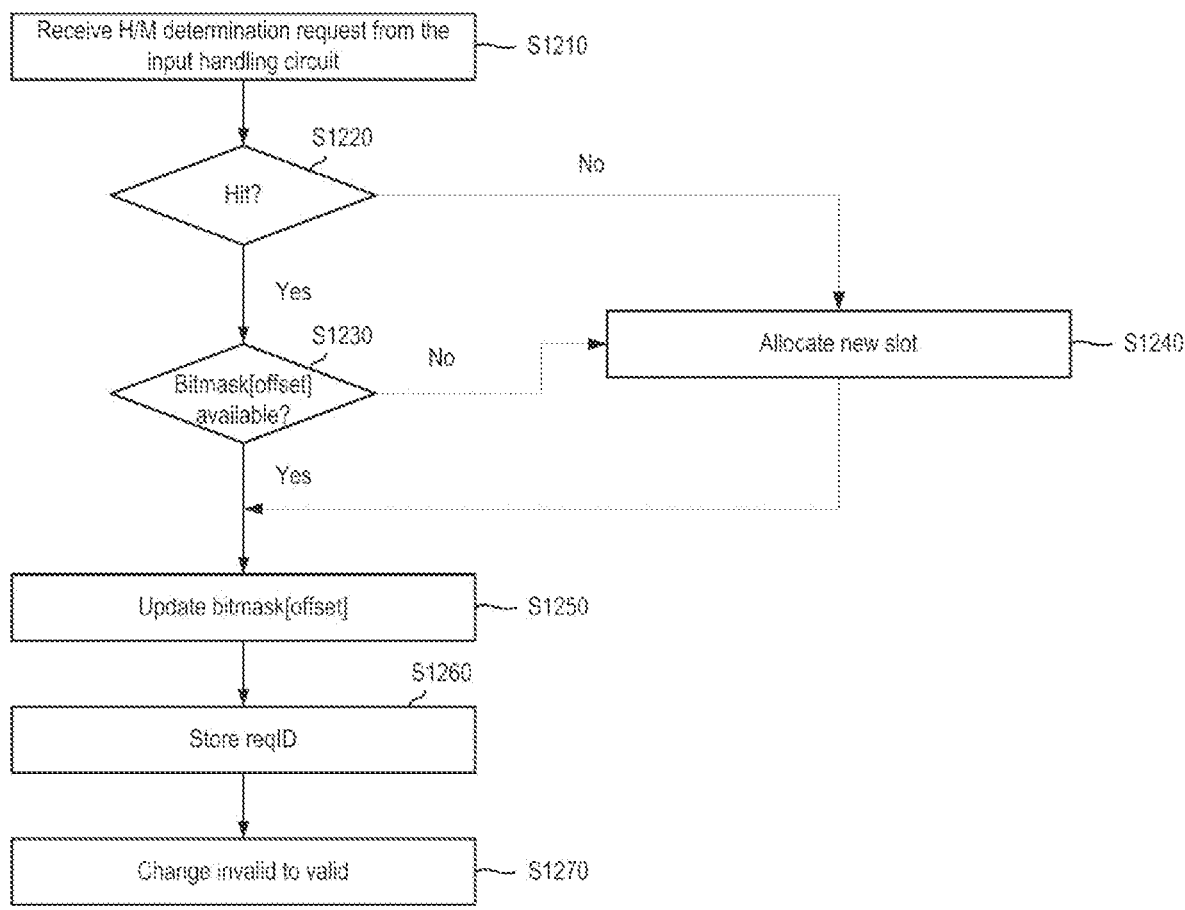
FIG. 12 is a flowchart illustrating a method of operating a control circuit according to some example embodiments.

FIG. 12 is a flowchart illustrating a method of operating a control circuit according to some example embodiments.

Referring to FIG. 12, in operation S1210, the control circuit 120 may receive a hit/miss determination request ReqD from the input handling circuit 110.

In operation S1220, the control circuit 120 may determine whether an address, which is a duplicate with an aligned address, is present according to various example embodiments.

When it is determined that a "hit" occurs (operation S1220, Yes), the control circuit 120 may identify a slot index corresponding to the first request Req1.

In operation S1230, the control circuit 120 may determine whether a bitmask offset is available. For example, the control circuit 102 may determine whether a single bit corresponding to a first request Req1 in a bitmask included in the identified slot (for example, an offset in the bitmask corresponding to the first request Req1) is available.

When it is determined that a "miss" occurs in operation S1220 (operation S1220, No) or when it is not determined that the single bit is available in operation S1230 (operation S1230, No), the control circuit 120 may allocate a new slot in operation S1240.

After the new slot is allocated, in operation S1250, the control circuit 120 may update the bitmask offset. For example, the control circuit 120 may update a single bit corresponding to the first request Req1 in the bitmask included in the new slot.

When it is determined that the single bit is available in operation S1230 (operation S1230, Yes), the control circuit 120 may update the single bit corresponding to the first request Req1 in the bitmask included in the identified slot, in operation S1250.

In operation S1260, the control circuit 120 may store a request identifier (reqID) corresponding to the first request Req1 in the identified slot or the new slot.

In operation S1270, the control circuit 120 may change the valid field 1210, included in the identified slot or the new slot, from invalid to valid.

Figure 13:
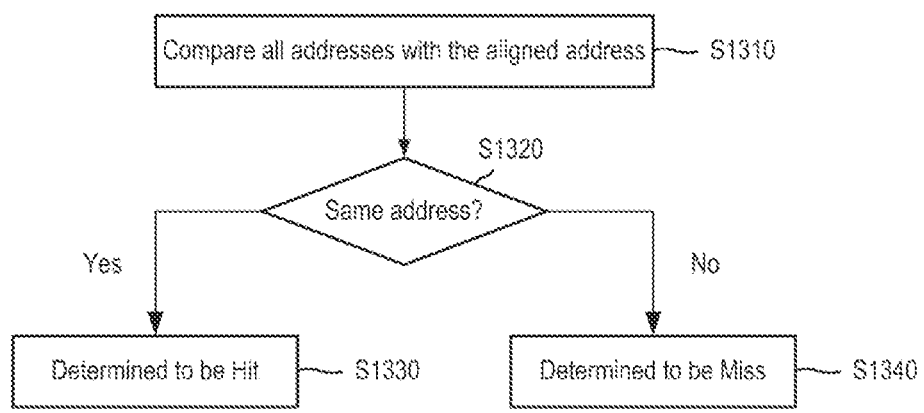
FIGS. 13 and 14 are flowcharts illustrating a determination operation method of a control circuit according to various example embodiments.
Figure 14:
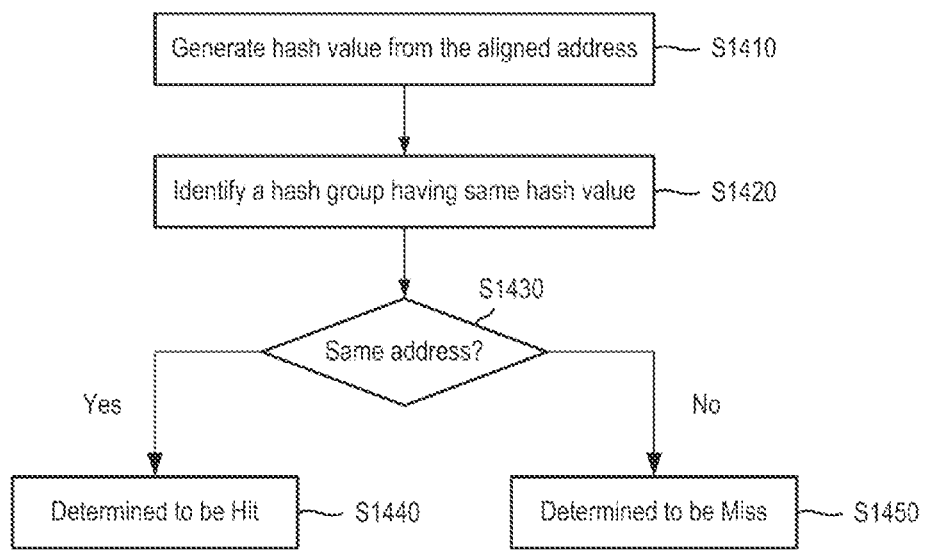

FIGS. 13 and 14 are flowcharts illustrating a determination operation method of a control circuit according to various example embodiments.

Referring to FIG. 13, in operation S1310, the control circuit 120 may compare an aligned address obtained from a first request Req1, with aligned addresses included in all slots.

Even when only one address is the same address (operation S1320, Yes), for example, when at least one address is a duplicate, the control circuit 120 may determine that a "hit" occurs, in operation S1320. When the same address as the aligned address is not present (operation S1320, No), the control circuit 120 may determine that a "miss" occurs, in operation S1330.

Referring to FIG. 14, In some example embodiments, the control circuit 120 may determine a "hit" or a "miss" based on a hash value. In operation S1410, the control circuit 120 may generate a hash value from the aligned address. In operation S1420, the control circuit 120 may identify a hash group having the same hash value using the generated hash value as a type of index.

In operation S1430, the control circuit 120 may compare all addresses, which are included in the hash group, with an aligned address.

Even when only one address is the same address (operation S1430, Yes), for example, when at least one address is duplicate, the control circuit 120 may determine that a "hit" occurs, in operation S1440. When the same address as the aligned address is not present (operation S1430, No), the control circuit 120 may determine that a "miss" occurs, in operation S1450.

Figure 15:
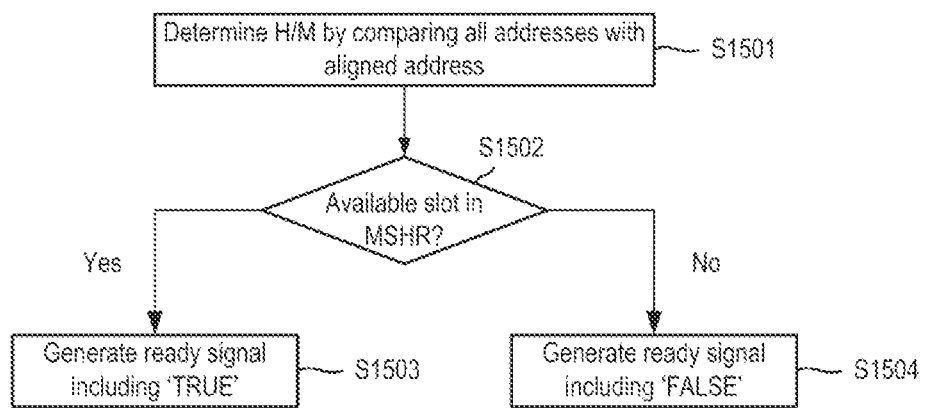
FIGS. 15, 16 and 17 are flowcharts illustrating a method of generating a ready signal according to various example embodiments.
Figure 16:
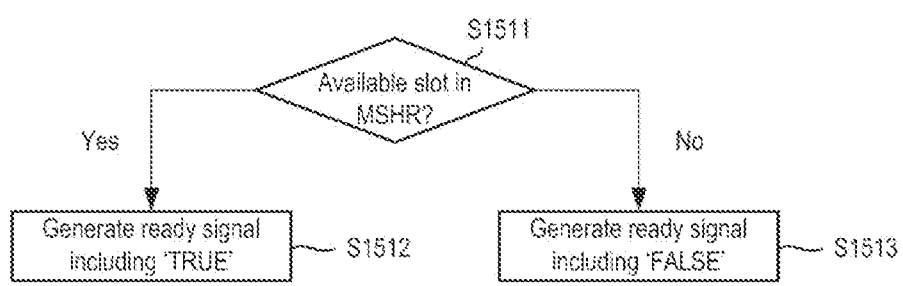
Figure 17:
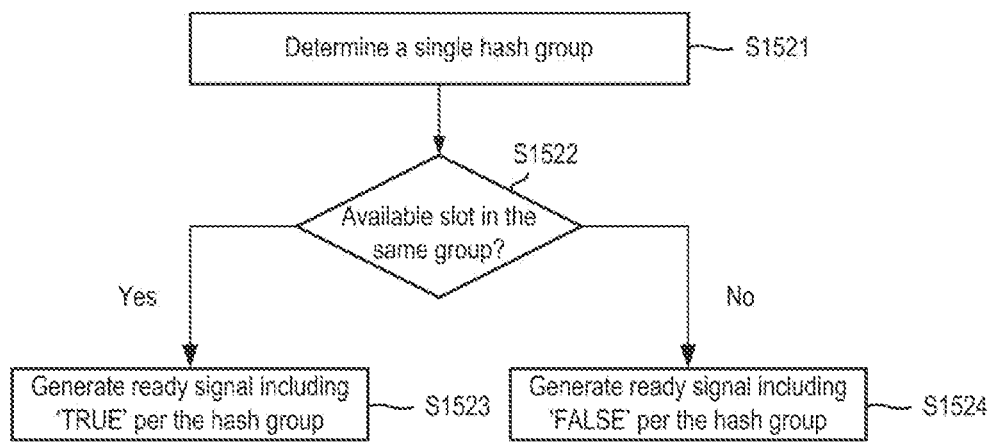

FIGS. 15, 16, and 17 are flowcharts illustrating a method of generating a ready signal according to various example embodiments.

Referring to FIG. 15, in operation S1501, the control circuit 120 may determine a "hit" or a "miss" based on comparison between an aligned address with addresses of all slots.

In operation S1502, the control circuit 120 may determine whether among managed slots, an allocable slot, for example, an empty slot, is present in the HSHR 3000. When it is determined that an allocable slot is present (operation S1502, Yes), the control circuit 120 may generate a ready signal indicating 'TRUE,' in operation S1503. When it is determined that no allocable slot is present (operation S1502, No), the control circuit 120 may generate a ready signal indicating 'FALSE,' in operation S1504.

According to various example embodiments, only one ready signal generated through operations S1503 and S1504 may be generated for all slots in the MSHR 3000.

Referring to FIG. 16, in operation S1511, the control circuit 120 may determine whether among managed slots, an allocatable slot is present in the MSHR 3000. When it is determined that an allocable slot is present (operation S1511, Yes), the control circuit 120 may generate a ready signal indicating 'TRUE,' in operation S1512. When it is determined that no allocable slot is present (operation S1511, No), the control circuit 120 may generate a ready signal indicating 'FALSE,' in operation S1513.

According to some example embodiments, only one ready signal generated through operations S1512 and S1513 may be generated for all slots in the MSHR 3000 regardless of hash groups.

Referring to FIG. 17, in operation S1521, the control circuit 120 may identify a single hash group corresponding to the first request Req1.

In operation S1522, the control circuit 120 may determine whether an allocable slot is present in the corresponding hash group. When it is determined that an allocable slot is present (operation S1522, Yes), the control circuit 120 may generate a ready signal indicating 'TRUE,' in operation S1523. When it is determined that no allocable slot is present (operation S1522, No), the control circuit 120 may generate a ready signal indicating 'FALSE,' in operation S1524.

According to some example embodiments, a single ready signal generated through operations S1523 and S1524 may be generated for each hash group.

Figure 18:
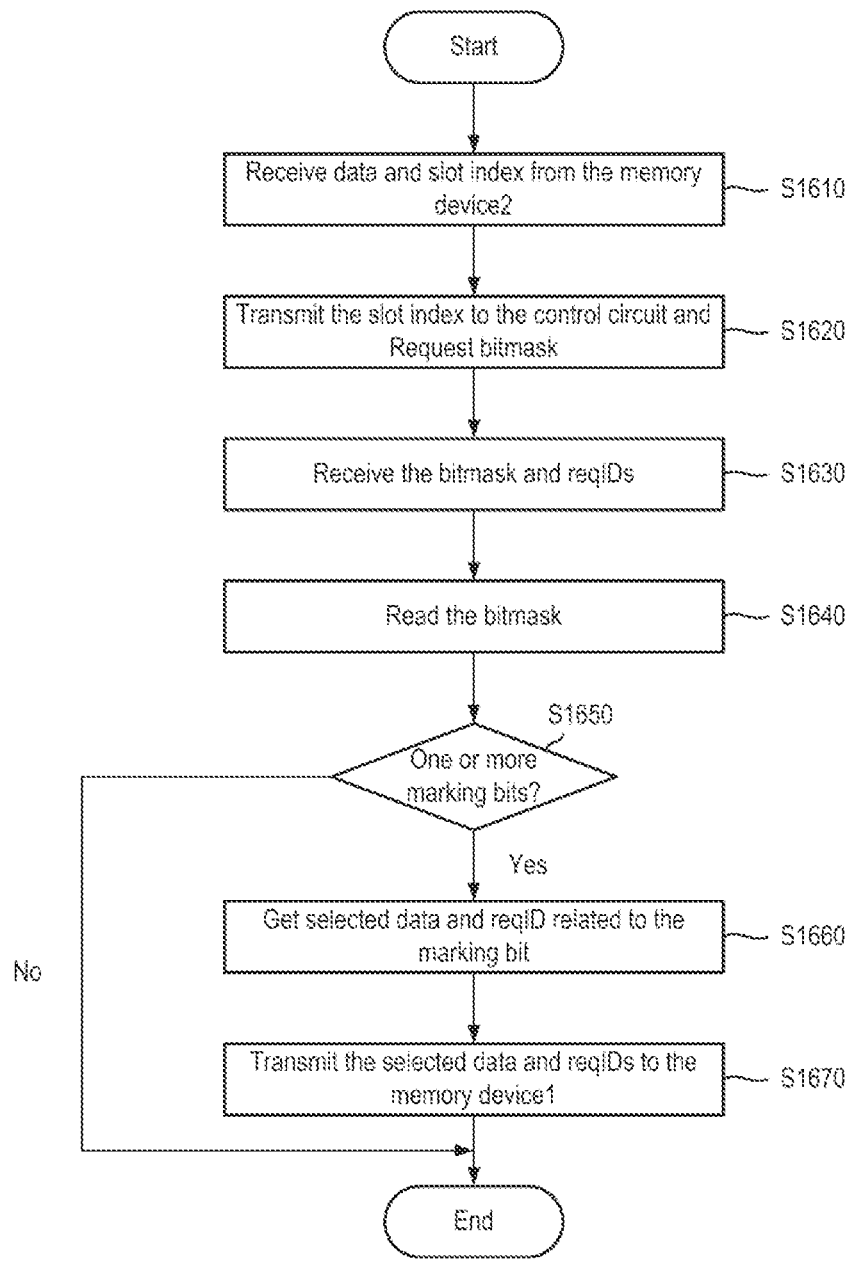
FIG. 18 is a flowchart illustrating a method of operating a data transfer circuit according to some example embodiments.

FIG. 18 is a flowchart illustrating a method of operating a data transfer circuit according to some example embodiments.

Referring to FIG. 18, in operation S1610, the data transfer circuit 130 may receive data and an index of a slot from the second memory device 20. The index may be transmitted together when the input handling circuit 110 transmits a second request Req2 to the second memory device 20.

In operation S1620, the data transfer circuit 130 may transmit the slot index to the control circuit 120 and request a bitmask. The control circuit 120, receiving a bitmask request RepB, may identify a slot based on the index and may transmit a bitmask included in the slot to the data transfer circuit 130.

In operation S1630, the data transfer circuit 130 may receive a bitmask and a request identifier (reqID) from the control circuit 120. The bitmask and the request identifier may be a bitmask and a request identifier updated through the control circuit 120. The bitmask may include one or more marking bits, and the request identifier may include one or more request identifiers corresponding to the one or more marking bits.

In operation S1640, the data transfer circuit 130 may read the received bitmask.

In operation S1650, the data transfer circuit 130 may determine whether there are one or more marking bits included in the bitmask. For example, the data transfer circuit 130 may determine whether there are one or more bits, having a specific logic state, among the one or more bits.

When it is determined that there are not one or more marking bits (operation S1650, No), the process may end. When it is determined that there are one or more marking bits (operation S1650, Yes), the data transfer circuit 130 may obtain selection data S_DAT corresponding to the marking bit, among a plurality of pieces of data received from the second memory 20, and a request identifier corresponding to each selection data S_DAT, in operation S1660.

In operation S1670, the data transfer circuit 130 may transfer the selection data S_DAT and the request identifier to the first memory device 10. For example, when a size of the first request Req1 is 64B, a data access unit of the second memory device 20 is 256B, and the received bitmask is '1110,' the data transfer circuit 130 may transfer selection data S_DAT corresponding to '111' to the first memory device 10.

Figure 19:
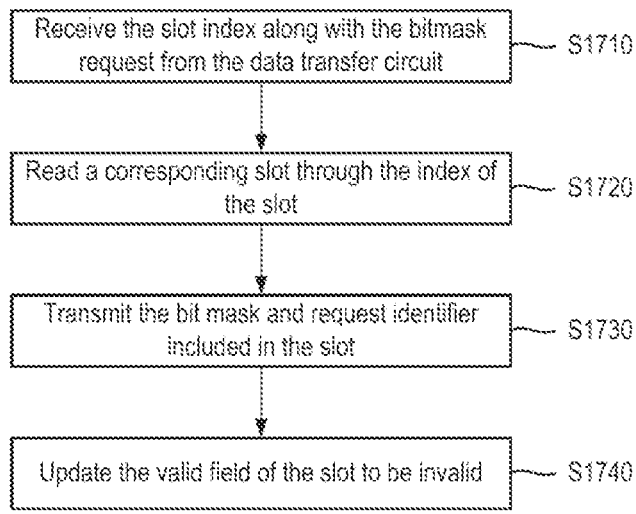
FIG. 19 is a flowchart illustrating an index processing operation of a control circuit according to some example embodiments.

FIG. 19 is a flowchart of an index processing operation of a control circuit according to some example embodiments.

Referring to FIG. 19, in operation S1710, the control circuit 120 may receive an index of a slot, together with a bitmask request ReqB, from the data transfer circuit 130. In operation S1720, the control circuit 120 may read the slot through the index of the slot. In operation S1730, the control circuit 120 may transmit a bitmask and request identifier, included in an identified slot, to the data transfer circuit 130. The request identifier may include one or more request identifiers corresponding to one or more marking bits. In operation S1740, the control circuit 120 may update a valid field 1210 of the identified slot to be invalid.

Figure 20:
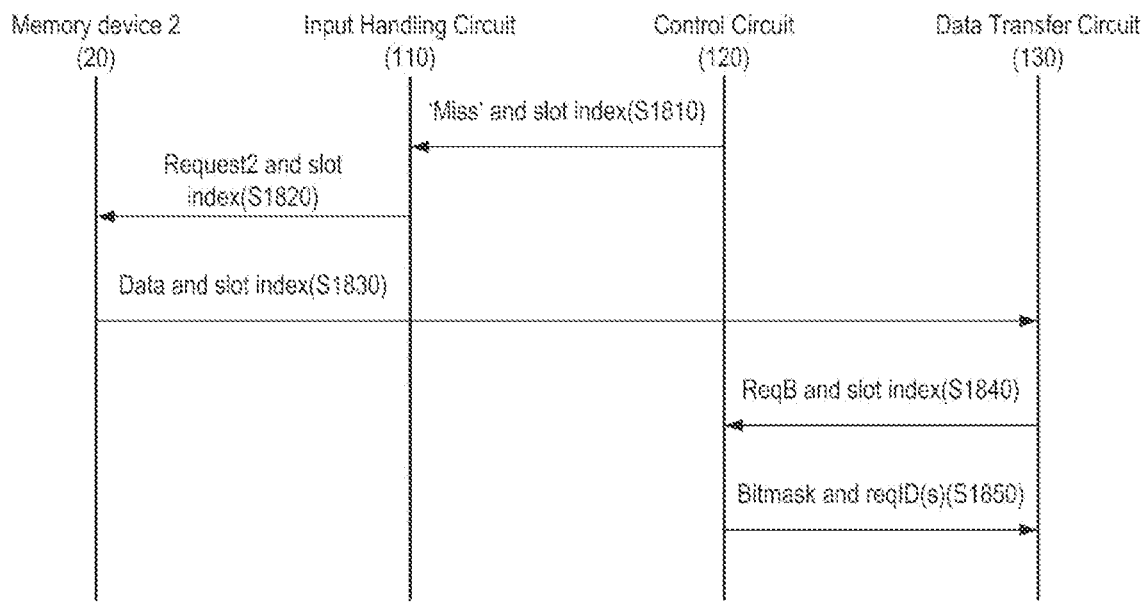
FIG. 20 is a diagram illustrating an index transmission operation of an electronic device according to some example embodiments.

FIG. 20 is a diagram illustrating an index transmission operation of an electronic device according to some example embodiments.

Referring to FIG. 20, when it is determined that a first request Req1 is "miss" according to the above-described embodiments, the control circuit 120 may transmit an index of a slot corresponding to the first request Req1, together with a determination result ("miss"), to the input handling circuit 110.

In operation S1820, the input handling circuit 110 may transmit the index of the slot, together with the second request Req2, to the second memory device 20.

In operation S1830, the second memory device 20 may transmit data corresponding to the second request Req2 and the index of the slot together to the second memory device 20, and the data transfer circuit 130 may receive the data and the index of the slot.

In operation S1840, the data transfer circuit 130 may transfer the index of the slot, together with the bitmask request ReqB, to the control circuit 120.

In operation S1850, the control circuit 120 may identify the slot through the index of the slot and may transmit a bitmask and a request identifier, included in the identified slot, to the control circuit 120.

Hereinafter, example embodiments related to a case, in which the first request Req1 requests a write in the second memory device 20, will be described. A detailed description of the contents overlapping those described above may be omitted for conciseness.

Figure 21:
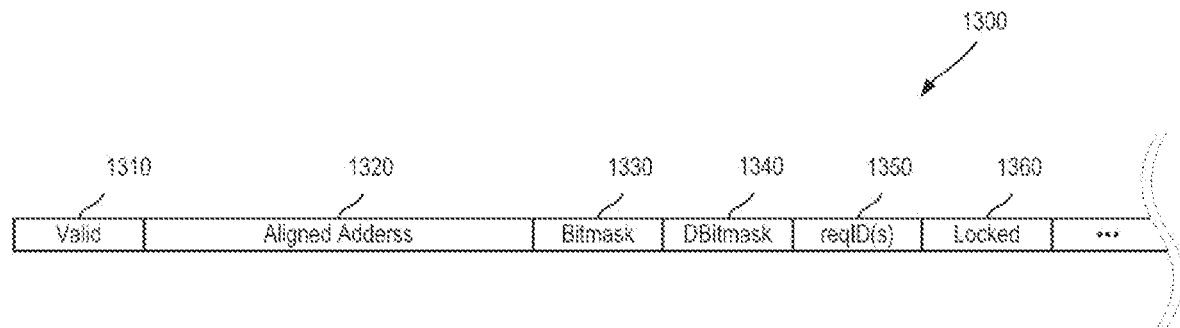
FIG. 21 is a diagram illustrating a slot according to some example embodiments.

FIG. 21 is a diagram illustrating a slot according to some example embodiments.

Referring to FIG. 21, a slot 1300 may further include a dirty bitmask field (DBitmask1340, in addition to a valid field 1310, an aligned address field 1320, a bitmask field 1330, and a request identifier field (reqIDs) 1350, and a locked field 1370.

The dirty bitmask field 1340 may be provided separately from the bitmask field 1330, and may be a field used when the first request Req1 requests a write operation. If another first request Req1 requesting a write is received from the first memory device 10 when a read operation is performed on a specific address according to the first request Req1, data to be transmitted to the first memory device 10 and overwritten data need to be distinguished from each other in terms of the electronic device 100. According to some example embodiments, when the dirty bitmask field 1340 is added to the slot 1300, the electronic device 100 may manage a first request Req1 associated with a read operation as a bitmask, and may manage a first request Req1 associated with a write operation as a dirty bitmask.

Similarly to the bitmask field 1330, the dirty bitmask field 1340 may include one or more bits. Each of the one or more bits, included in the dirty bitmask, may correspond to the first request Req1 and may indicate a location corresponding to the first request Req1 within an access unit of the second memory device 20, similarly to the bitmask. Each of the one or more bits may be updated to a specific logic state (for example, '0' or '1') after the first request Req1 requesting a write operation is received. However, there is a difference between the bitmask field 1330 and the dirty bitmask field 1340. The bitmask field 1330 relates to the first request Req1 requesting a read operation, whereas the dirty bitmask field 1340 relates to the first request Req1 requesting a write operation.

Even when among one or more bits included in the dirty bitmask, only one marking bit including a specific logic state is present, the electronic device 100 may request the second memory device 20 to write all pieces of data corresponding to an access unit of the second memory device 20.

Figure 22:
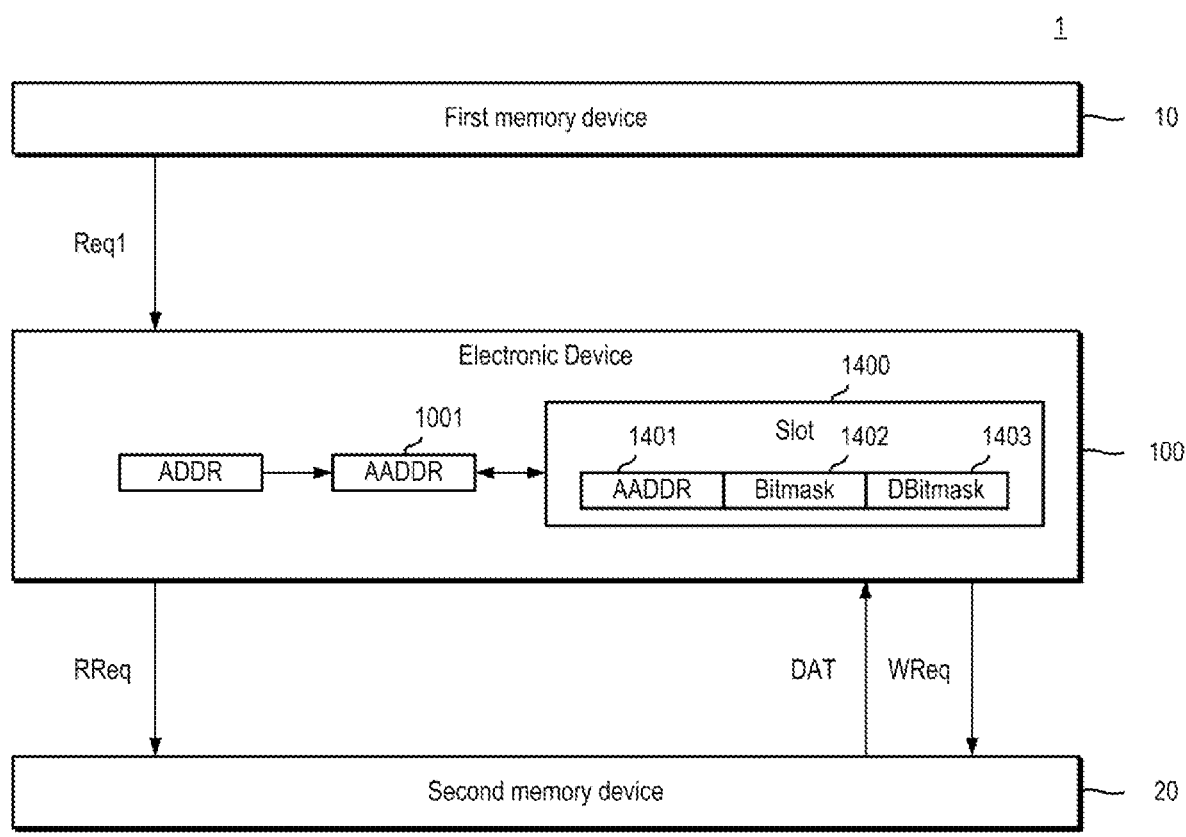
FIG. 22 is a diagram illustrating a memory system according to some example embodiments.

FIG. 22 is a diagram illustrating a memory system according to some example embodiments.

Referring to FIG. 22, a slot 1400 managed by the electronic device 100 included in the memory system 1 may further include a dirty bitmask 1403, in addition to an aligned address 1401 and a bitmask 1402.

The electronic device 100 may receive a first request Req1, including an address ADDR and write data, from the first memory device 10. In this case, the first request Req1 may be a request requesting a write operation.

When the electronic device 100 receives the first request Req1, the address ADDR included in the first request Req1 may be aligned according to the data access unit of the second memory device 20 to obtain an aligned address 1401. The electronic device 100 may compare the aligned address 1401, obtained from the received first request Req1, with the sorted address 1401, included in the managed slot 1400, to determine whether a duplicate address is present.

When it is determined that a "miss" occurs, the electronic device 100 may allocate a new slot. The electronic device 100 may update a single bit, corresponding to the first request Req1, among one or more bits included in a dirty bitmask included in the new slot.

When it is determined that a "miss" occurs, the electronic device 100 may transmit a read request RReq to the second memory device 20. In some example embodiments, the electronic device 100 may transmit information, indicating that the read request RReq is a request for a write operation, together with the read request RReq. The read request RReq may be a request for reading data to be overwritten first from the second memory device 20 before the electronic device 100 requests a write operation.

The electronic device 100 may store write data, included in the first request Req1, in an additional write buffer.

When it is determined that a "hit" occurs, the electronic device 100 may identify an index of a slot 1400 corresponding to the first request Req1 and may identify a dirty bitmask 1403 of the corresponding slot 1400. The electronic device 100 may identify a single bit corresponding to the first request Req1 in the dirty bitmask 1403, and may identify whether the single bit is available.

In some example embodiments, the electronic device 100 may update a single bit included in the dirty bitmask 1403 if one bit included in the dirty bitmask 1403 is available. The electronic device 100 may allocate a new slot 1400 when the single bit included in the dirty bitmask 1403 is not available. The electronic device 100 may update the single bit included in the dirty bitmask 1403 included in the new slot 1400.

When it is determined that a "miss" occurs, the electronic device 100 may transmit the read request RReq to the second memory device 20 and may then receive read data DAT corresponding to the read request RReq. The electronic device 100 may identify the slot 1400 and the dirty bitmask 1403 corresponding to the received read data DAT. When it is identified that one of the one or more bits included in the dirty bitmask 1403 has a specific logic state, the electronic device 100 may request a write request WReq to the second memory device 20. The electronic device 100 may overwrite write data, corresponding to the first request Req1 previously stored in the write buffer, with read data received from the second memory device 20 and may transmit a write request WReq for finally overwritten data to the second memory device 20.

According to some example embodiments, the electronic device 100 may already receive the first request Req1, requesting a read operation, before receiving the first request Req1 requesting a write operation. In this case, the electronic device 100 should transmit data before data requested to be read is written by a write operation to the memory device 10. Accordingly, the electronic device 100 may manage and update the bitmask 1402 and the dirty bitmask 1403 together.

For example, the electronic device 100 may identify a single bit corresponding to the first request Req1 requesting a write operation in the bitmask 1402 and the dirty bitmask 1403. When the single bit included in the bitmask 1402 corresponds to a specific logic state, data needs to be processed in the order in which a write operation and a read operation are requested. Accordingly, the electronic device 100 may process data in consideration of the order of the first request Req1 requesting a write operation and the first request Req1 requesting a read operation.

For example, when the first request Req1 requesting a read operation needs to be processed first, the electronic device 100 may identify the slot 1400 corresponding to the data received from the second memory device 20 and may transmit selection data to the first memory device 10 based on the bitmask 1402 included in slot 1400. Then, the electronic device 100 may identify the dirty bitmask 1403 corresponding to the data received from the second memory device 20 and may request a write operation to the second memory device 20 when it is identified that even one of the one or more bits included in the dirty bitmask 1403 has the specific logic state. As described above, data with which write data previously stored in the write buffer is overwritten may be transmitted when a write operation is requested.

According to the above-described embodiments, the electronic device 100 may manage and update the bitmask 1402 and the dirty bitmask 1403 together to determine duplicate requests for both a write operation and a read operation. Accordingly, the number of accesses to data of a lower memory according to duplicate requests may be reduced to prevent deterioration of performance and an increase in power consumption. In addition, data may be processed in the order in which a write operation and a read operation are requested, so that read data may be prevented from being changed.

Figure 23:
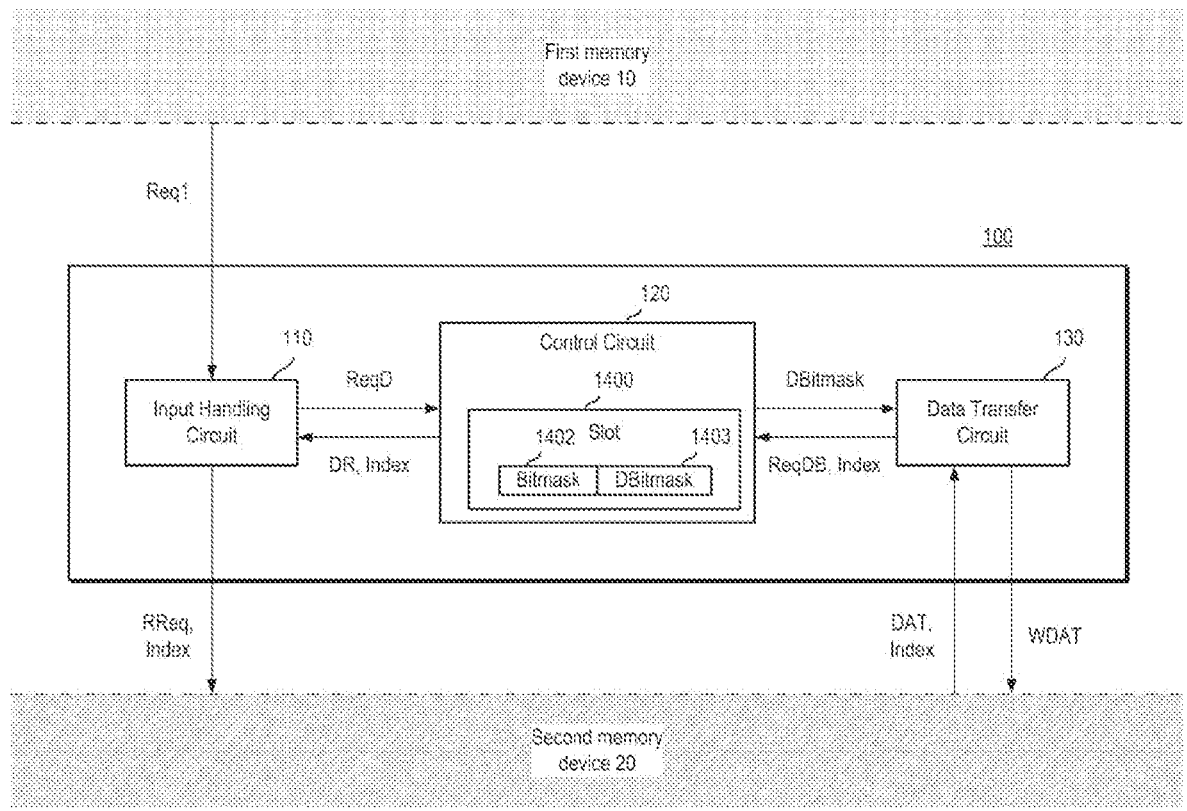
FIG. 23 is a diagram illustrating an electronic device according to some example embodiments.

FIG. 23 is a diagram illustrating an electronic device according to some example embodiments.

Referring to FIG. 23, an input handling circuit 110, a control circuit 120, and a data transfer circuit 130 included in an electronic device 100 may perform a write operation on a second memory device 20 according to example embodiments.

The input handling circuit 110 may first receive a first request Req1, requesting a read operation, from the first memory device 10. The input handling circuit 110 may generate an aligned address from an address included in the first request Req1, and may transmit a hit/miss determination request ReqD for the aligned address to the control circuit 120.

The control circuit 120 may determine whether an address duplicate with the aligned address received from the input handling circuit 110 is present, based on the hit/miss determination request ReqD. The control circuit 120 may manage the dirty bitmask 1403 based on a result of the determination. In some example embodiments, the control circuit 120 may allocate a new slot 1400 to the first request Req1 when it is determined that a "miss" occurs. Similarly, the new slot 1400 may include a bitmask 1402 and a dirty bitmask 1403 and may update a single bit corresponding to the first request Req1, among one or more bits included in the dirty bitmask 1403.

In some example embodiments, when it is determined that a "hit" occurs, the control circuit 120 identify whether among the one or more bits included in the dirty bitmask 1403, the single bit corresponding to the first request Req1 is available. When the single bit is available, the control circuit 120 may update the single bit. Meanwhile, when the single bit is not available, the control circuit 120 may allocate a new slot 1400.

In some example embodiments, the control circuit 120 may store write data, included in the first request Req1, in an additional write buffer. The write buffer may be a physical resource to which both the control circuit 120 and the data transfer circuit 130 are accessible.

The control circuit 120 may transmit an index of the slot 1400 corresponding to the determination result DR and the first request Req1 to the input handling circuit 110.

When it is determined that a "miss" occurs, the input handling circuit 110 may transmit a read request RReq and the index of the slot 1400 to the second memory device 20.

The data transfer circuit 130 may receive read data DAT corresponding to the read request RReq and the index of the slot 1400 from the second memory device 20. The data transfer circuit 130 may request the dirty bitmask 1403, together with the index of the slot 1400, to the control circuit 120.

The control circuit 120 may identify the slot 1400 corresponding to the received index and may transmit the dirty bitmask 1403, included in the identified slot 1400, to the data transfer circuit 130.

The data transfer circuit 130 may request a write operation to the second memory device 20 when it is determined that even one of the one or more bits, included in the dirty bitmask 1403, has a specific logic state. In this case, the data transfer circuit 130 may overwrite the read data DAT with write data stored in the write buffer and may transmit the overwritten data WDAT to the second memory device 20.

Figure 24:
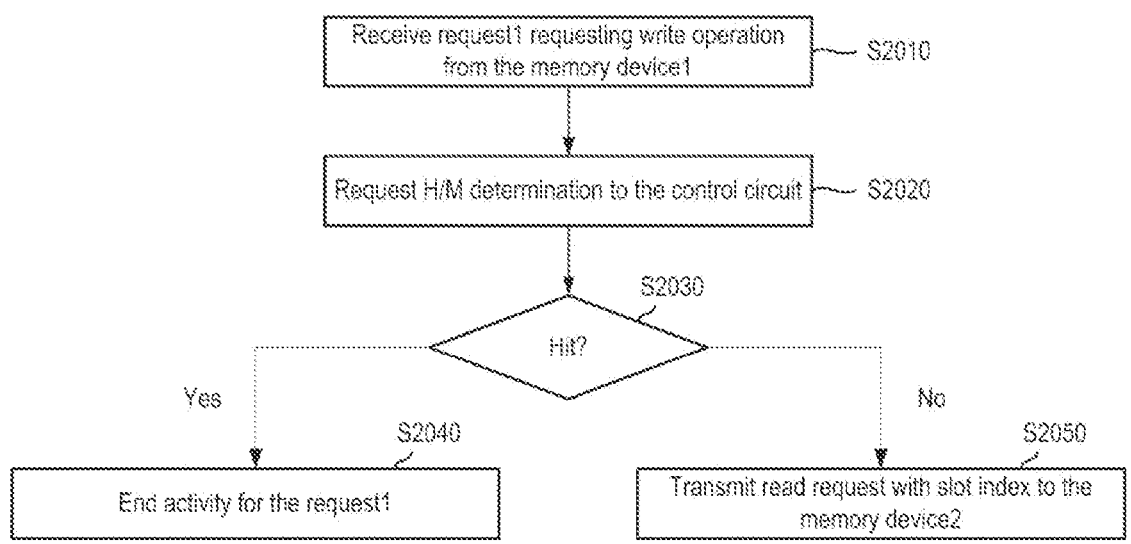
FIG. 24 is a flowchart illustrating an operating method for a write request of an input handling process according to some example embodiments.

FIG. 24 is a flowchart illustrating an operating method for a write request of an input handling process according to some example embodiments. A detailed description of the contents overlapping those described above may be omitted.

Referring to FIG. 24, in operation S2010, the input handling circuit 110 may receive a first request Req1 requesting a write operation from the first memory device 10. In operation S2020, the input handling circuit 110 may request the control circuit 120 to determine a "hit" or a "miss" for the first request Req1. In operation S2030, the control circuit 120 may determine whether a "hit" or "miss" occurs.

When it is determined that a "hit" occurs (operation S2030, Yes), the input handling circuit 110 may end an activity for the first request Req1 in operation S2040. When it is determined that a "miss" occurs (operation S2030, No), the input handling circuit 110 may transmit a read request RReq, together with an index of a slot 1300, to the second memory device 20 in operation S2050. The index may be used to identify the slot 1300 for identifying a location in which data is to be overwritten later with data received from the second memory device 20.

Figure 25:
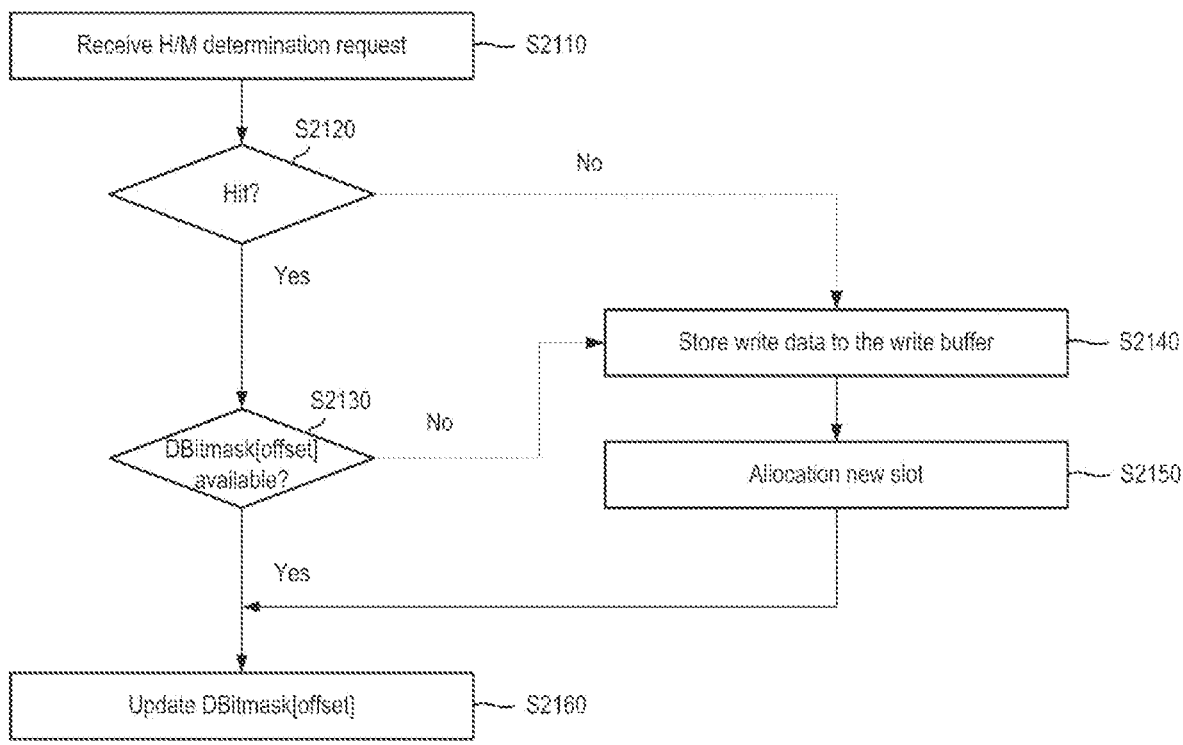
FIG. 25 is a flowchart illustrating a method of operating a control circuit in response to a write request according to some example embodiments.

FIG. 25 is a flowchart illustrating a method of operating a control circuit in response to a write request according to some example embodiments.

Referring to FIG. 25, in operation S2110, the control circuit 120 may receive a hit/miss determination request ReqD from the input handling circuit 110. In operation S2120, the control circuit 120 may determine whether an aligned address and a duplicate address are present, according to various embodiments.

When it is determined that an aligned address and a duplicate address are present (i.e., a "hit" occurs) (operation S2120, Yes), the control circuit 120 may identify an index of a slot 1300 corresponding to the first request Req1. In operation S2130, the control circuit 120 may determine whether a single bit corresponding to the first request Req1 in a dirty bitmask included in the identified slot 1300 (for example, an offset in a bitmask corresponding to the first request Req1) is available.

When it is determined that a "miss" occurs in operation S2120 (operation S2120, No) or when it is determined that a single bit is not available in operation S2130 (operation S2130, No), the control circuit 120 may store write data in a write buffer in operation S2140.

In operation S2150, the control circuit 120 may allocate a new slot 1300. After allocating the new slot 1300, the control circuit 120 may update a single bit corresponding to the first request Req1 in the dirty bitmask included in the new slot 1300 in operation S2160

When it is determined that the single bit is available in operation S2130 (operation S2130, Yes), the control circuit 120 may update the single bit corresponding to the first request Req1 in a dirty bitmask included in the identified slot 1300 in operation S2160.

Figure 26:
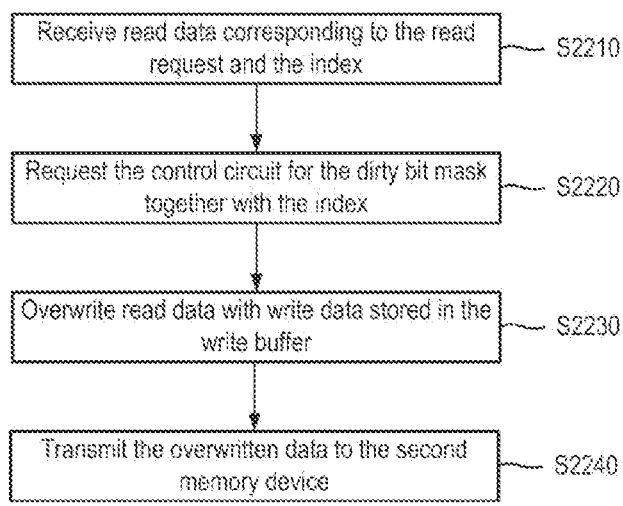
FIG. 26 is a flowchart illustrating a method of operating a data transfer circuit in response to a write request according to some example embodiments.

FIG. 26 is a flowchart illustrating a method of operating a data transfer circuit in response to a write request according to some example embodiments.

Referring to FIG. 26, in operation S2210, the data transfer circuit 130 may receive read data corresponding to a read request RReq and an index of the slot 1300 from the second memory device 20. In operation S2220, the data transfer circuit 130 may request a dirty bitmask, together with the index of the slot 1300, from the control circuit 120.

In operation S2230, the data transfer circuit 130 may overwrite the read data with write data stored in a write buffer even when at least one of the one or more bits included in the dirty bitmask has a specific logic state. In operation S2240, the data transfer circuit 130 may transmit the overwritten data to the second memory device 20.

Figure 27:
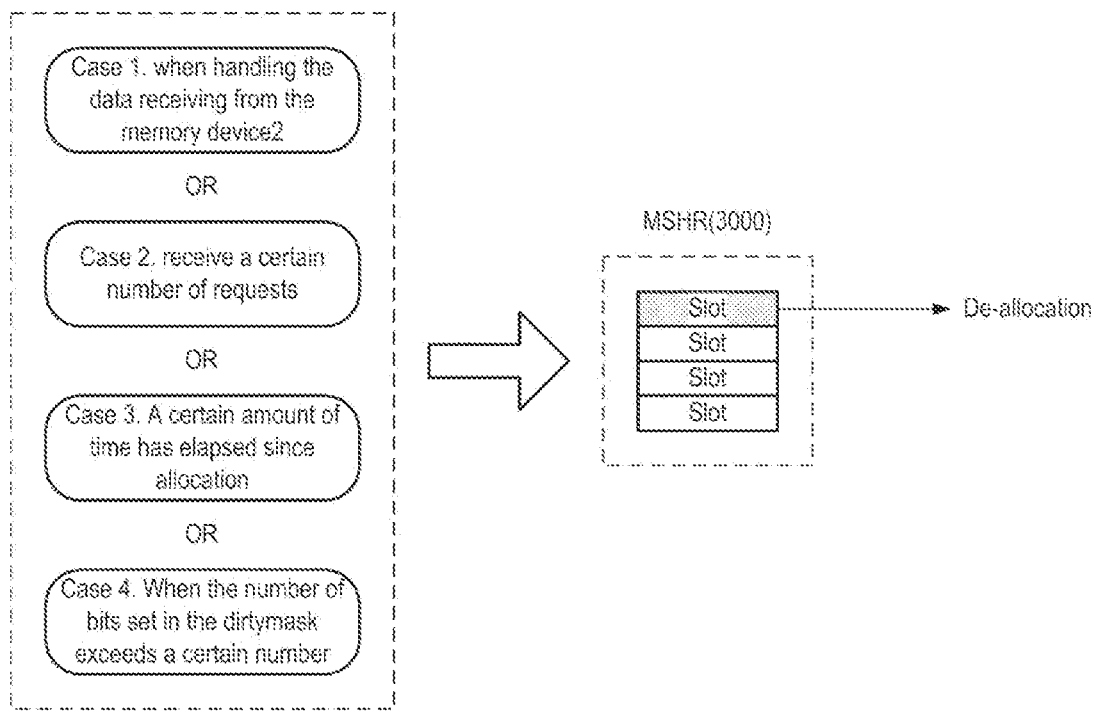
FIG. 27 is a diagram illustrating a slot deallocation operation according to some example embodiments.

FIG. 27 is a diagram illustrating a slot deallocation operation according to some example embodiments.

Referring to FIG. 27, when all slots in the MSHR 3000 are used, an available slot to process a first request Req1 may not be present. For example, when the electronic device 100 processes a plurality of first requests Req1 and allocates a new slot whenever a first request Reg1 determined to be "miss" is present, all slots in the MSHR 3000 may be eventually used.

Accordingly, at least one of the allocated slots may be deallocated to process a new request according to various embodiments. In example embodiments, the term "deallocation" may mean that a valid field included in a slot is changed to be invalid. For example, the deallocation may be applied to a slot indicating a locked field included in a slot is locked (for example, 'TRUE'), for example, a request of which return has already been completed.

In some example embodiments, the electronic device 100 may deallocate at least one slot when processing data received from the second memory device 20 (Case 1). For example, the electronic device 100 may receive data from the second memory device 20, may identify a bitmask or a dirty bitmask for the received data, and may transmit the data to the first memory device 10 or the second memory device 20 according to the bitmask or the dirty bitmask. The electronic device 100 may deallocate a slot corresponding to the transmitted data.

In some example embodiments, the electronic device 100 may deallocate at least one slot when receiving a specific number of first requests Req1 from the first memory device 10 (Case 2). For example, the electronic device 100 may deallocate a portion of slots which are being allocated when receiving an excessive number of first requests Req1 to be processed. For example, the specific number may be set based on the number of slots manageable in the MSHR 3000. For example, the electronic device 100 may deallocate at least one slot when receiving a specific number of first requests Req1, regardless of the number of available slots in the MSHR 3000.

In some example embodiments, the electronic device 100 may deallocate a slot when a specific time elapses after allocating the slot (Case 3). For example, the electronic device 100 may deallocate after a specific time has elapsed from the allocation, regardless of the number of available slots in the MSHR 3000.

In some example embodiments, the electronic device 100 may deallocate a slot when the number of bits indicating a specific logic state, for example, the number of marking bits, in the dirty bitmask is greater than or equal to a specific number (Case 4).

According to the above-described embodiments, when a limited number of slots are operated in the MSHR 3000, allocated slots may be deallocated in consideration of various conditions to appropriately process received requests.

Figure 28:
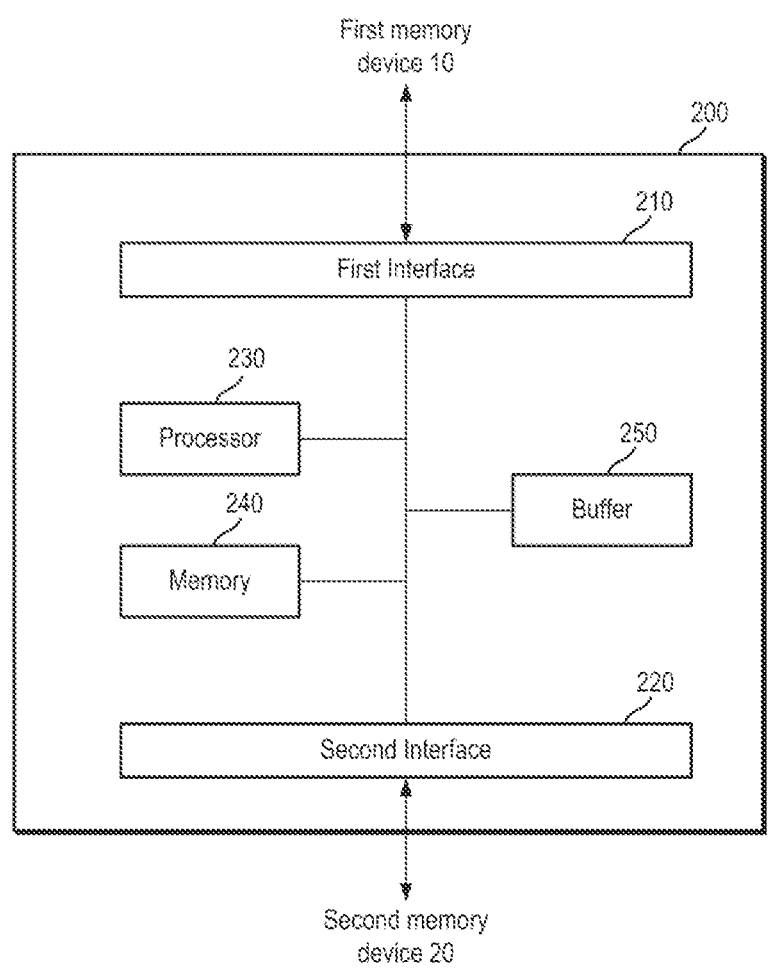
FIG. 28 is a diagram illustrating an electronic device according to some example embodiments.

FIG. 28 is a diagram illustrating an electronic device according to some example embodiments.

Referring to FIG. 28, an electronic device 200 may include a first interface 210, a second interface 220, a processor 230, a memory 240, and a buffer 250.

The first interface 210 may provide an interface function between the first memory device 10 and the electronic device 200. The first interface 210 may transmit and receive write data, read data, and various requests to and from the first memory device 10. The first request Req1 may process a request transmitted from the first memory device 10.

The second interface 220 may provide an interface function between the second memory device 20 and the electronic device 200. The second interface 220 may control the second memory device 20 to perform a read operation, a write operation, or an erase operation according to a request issued from the first memory device 10 through the first interface 210.

The processor 230 may be provided as at least one processor. The processor 230 may control the memory 240 and may be configured to execute at least one instruction, stored in the memory 240, to implement the descriptions, functions, procedures, suggestions, methods, and/or operating flowcharts of the present disclosure. The processor 230 may provide operations according to various example embodiments based on the instruction stored in the memory 240. The processor 230 may process information, stored in the memory 240, to generate data.

As an example, the processor 230 may receive a first request Req1 including an address from the first memory device 10. The processor 230 may determine whether an address duplicate with an aligned address is present, and may generate a result of the determination. The processor 230 may transmit a second request Req2 to the second memory device 20 when it is determined that a "miss" occurs, for example, when an address duplicate with an address aligned with an access unit of the second memory device 20 is not present. The processor 230 may receive data corresponding to the second request Req2 from the second memory device 20 and may transmit the received data based on a bitmask updated depending on whether the duplicate address is present.

As an example, when the first request Req1 requests a write operation, the processor 230 may identify a dirty bitmask provided separately from the bitmask, and may request the write operation to the second memory device 20 when it is determined that even only one bit, among one or more bits included in the dirty bitmask, has a specific logic state.

The memory 240 may be provided as at least one memory. The memory 240 may store a code and data required to drive the electronic device 200. The memory 240 may be connected to the processor 230 and may store various pieces of information related to the operation of the processor 230. For example, the memory 240 may execute some or all processes controlled by the processor 230, or may store a software code including at least one instruction for performing the descriptions, functions, procedures, suggestions, methods, and/or operating flowcharts of the present disclosure.

The buffer 250 may buffer write data transmitted from the first memory device 10, or read data transmitted from the second memory device 20 and may store the buffered data. In addition, the code and data required to the electronic device 200 may be loaded into the buffer 250 during initialization or booting of the electronic device 200. In some example embodiments, the buffer 250 may store write data when a write operation according to the above-described embodiments is performed. When the processor 230 transmits data to the second memory device 20, the stored write data may be read from the buffer 250 according to a request of the processor 230. In some example embodiments, the buffer 250 may store a queue in a FIFO scheme for managing the first request Req1 according to the above-described embodiments.

Figure 29:
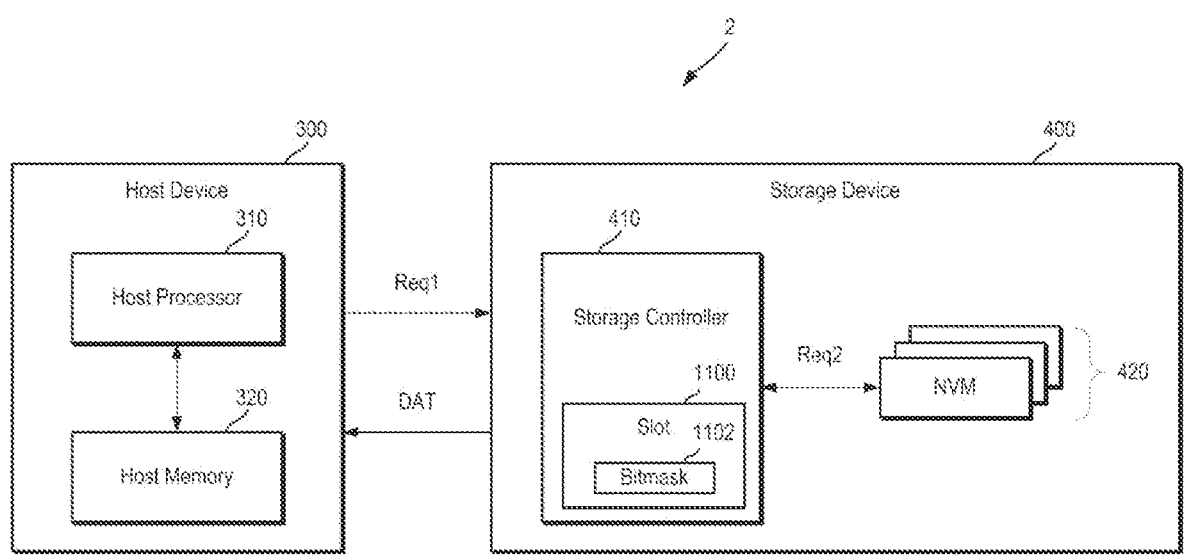
FIG. 29 is a diagram illustrating a storage system according to some example embodiments.

FIG. 29 is a diagram illustrating a storage system according to some example embodiments.

Referring to FIG. 29, a storage system 2 according to an example embodiment may include a host device 300 and a storage device 400.

The host device 300 may include a host processor 310 and a host memory 320. The host processor 310 may control an operation of the host device 300. For example, the host processor 310 may execute an operating system (OS) for controlling peripheral devices including the storage device 400. For example, the host processor 310 may include any processor such as a central processing unit (CPU).

The host memory 320 may store an instruction and data executed and processed by the host processor 310. For example, host memory 320 may include a volatile memory and/or a nonvolatile memory 420. For example, the host memory 320 may store a queue for the above-described first request Req1.

The host device 300 may generate a first request Req1 including various commands and addresses, and may transmit the first request Req1 to the storage device 400.

The storage device 400 may be accessed by the host device 300 and may receive the first request Req1, requesting a write operation or a read operation, from the host device 300, or transmit a response to the first request Req1 or data DAT stored in the non-volatile memory 420.

The storage device 400 may include a storage controller 410 and a nonvolatile memory 420.

The storage controller 410 may be connected to the nonvolatile memory 420 to the overall operation of the storage device 400 including the nonvolatile memory 420. The storage controller 410 may perform operations according to above-described various embodiments.

In some example embodiments, the storage controller 410 may receive the first request Req1 including an address from the host device 300 and may generate an aligned address from the address included in the first request Req1. The storage controller 410 determines whether an address that is a duplicate with the aligned address is present. When the duplicate is not present, the storage controller 410 may transmit a second request Req2 to the nonvolatile memory 420. The storage controller 410 may receive data corresponding to the second request Req2 from the second memory device 20. The storage controller 410 may transmit data to the host device 300 based on a bitmask 1102 updated depending on whether the duplicate address is present. The storage controller 410 may identify a slot 1100 and a bitmask 1102 included in the slot 1100 through an index of the slot 1100, and may update the identified bitmask 1102 or select data to be transmitted through the bitmask 1102.

The nonvolatile memory 420 may be controlled by the storage controller 410. The nonvolatile memory 420 may store data transmitted from the host device 300, data generated by the storage device 400, or other various types of data written by the storage controller 410. In some example embodiments, the nonvolatile memory 420 may be any nonvolatile memory 420 such as a NAND flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like, but example embodiments are not limited thereto.

As described above, according to some example embodiments, an electronic device managing duplicate requests and a method of operating the same may be provided.

According to example embodiments, the number of accesses to data of a lower memory may be reduced to prevent deterioration of performance of a memory system and an increase in power consumption of the memory system.

While example embodiments have been shown and described above, it will be apparent to those skilled in the art that modifications and variations could be made without departing from the scope of the present inventive concept as defined by the appended claims.

What is claimed is:

1. An electronic device comprising:
an input handling circuit configured to receive a first request including an address from a first memory device, to align the address with an access unit of a second memory device to generate an aligned address, to request a determination for the aligned address, and to transmit a second request to the second memory device based on a determination result;
a control circuit configured to determine, based on the request, whether a duplicate address that is a duplicate with the aligned address is present to generate the determination result and to update a bitmask based on the determination result; and
a data transfer circuit configured to receive data corresponding to the second request from the second memory device and to transfer the data based on the bitmask,
wherein the bitmask comprises one or more bits, each corresponding to the first request and indicating a location corresponding to the first request within an access unit of the second memory device.

2. The electronic device of claim 1, wherein:
the determination result comprises a hit, indicating that the duplicate address is present, and a miss indicating that the duplicate address is not present.

3. The electronic device of claim 2, wherein:
the input handling circuit transmits the aligned address and an index of a slot comprising the bitmask to the second memory device based on the first request when the determination result is the miss.

4. The electronic device of claim 2, wherein:
the control circuit allocates a new slot for the first request and updates a valid field, a bitmask, and a request identifier that are included in the new slot when the determination result is the miss.

5. The electronic device of claim 2, wherein:
when the determination result is the hit, the control circuit identifies whether, among the one or more bits, a single bit corresponding to the first request is available, and updates the single bit, a valid field, and a request identifier that are included in a slot including the bitmask, when the single bit is available.

6. The electronic device of claim 5, wherein:
the control circuit allocates a new slot to the first request when the single bit is not available, and updates a valid field, a bitmask, and a request identifier that are included in the new slot.

7. The electronic device of claim 3, wherein:
the data transfer circuit receives the index from the second memory device and transfers the index to the control circuit, and
the control circuit identifies the slot based on the index and transmits the bitmask and a request identifier, included in the slot, to the data transfer circuit.

8. The electronic device of claim 7, wherein the data transfer circuit is configured to:
receive the bitmask and the request identifier from the control circuit;
identify one or more marking bits having a specific logic state, among the one or more bits; and
transmit one or more pieces of data, corresponding to the one or more marking bits, of the data and the request identifier to the first memory device.

9. The electronic device of claim 1, wherein the control circuit is configured to:
generate a hash value from the aligned address;
identify hash groups having a same value as the hash value; and
compare all addresses, included in the hash groups that are identified, with the aligned address to generate the determination result.

10. The electronic device of claim 5, wherein:
the slot further comprises a lock field indicating whether the slot is locked,
the control circuit requests the data transfer circuit to transfer data when the lock field indicates locking, it is determined that the hit occurs, and the single bit corresponding to the first request, among the one or more bits, is available, and
the data transfer circuit responds to the first request and transfers previously stored data to the first memory device.

11. The electronic device of claim 10, wherein:
an update operation on the slot is blocked when the lock field indicates locking.

12. The electronic device of claim 9, wherein:
the control circuit generates a ready signal for each of the hash groups that are identified, the ready signal notifying the first memory device whether the control circuit is ready to receive the request, and
the ready signal is generated when an empty slot is present among one or more slots corresponding to the hash group.

13. A method of operating an electronic device, the method comprising:

receiving a first request comprising an address from a first memory device;

transmitting a second request to a second memory device when a duplicate address, which is a duplicate with an aligned address generated by aligning the address of the first request with an access unit of the second memory device, is present;

receiving data corresponding to the second request from the second memory device; and transmitting the data based on a bitmask that is updated depending on whether the duplicate address is present, wherein the bitmask comprises one or more bits, each corresponding to the first request and indicating a location corresponding to the first request within an access unit of the second memory device.

14. The method of claim 13, further comprising:

determining whether the duplicate address is present and generating a determination result, wherein, when the duplicate address is present, the determination result is a hit, and when the duplicate address is not present, the determination result is a miss.

15. The method of claim 14, further comprising:

when the determination result is the miss, allocating a new slot for the first request; and updating a valid field, a bitmask, and a request identifier that are included in the new slot.

16. The method of claim 14, further comprising:

when the determination result is the hit, identifying whether a single bit corresponding to the first request is available among the one or more bits; and when the single bit is available, updating the single bit, a valid field, and a request identifier that are included in a slot including the bitmask.

17. The method of claim 16, further comprising:

when the single bit is not available, allocating a new slot to the first request when the single bit; and updating a valid field, a bitmask, and a request identifier that are included in the new slot.

18. An electronic device comprising:

a memory configured to store at least one instruction; and at least one processor configured to access the memory and execute the at least one instruction to at least:

receive a first request comprising an address from a first memory device;

transmit a second request to a second memory device when a duplicate address, which is a duplicate with an aligned address generated by aligning the address of the first request with an access unit of a second memory device, is not present;

receive data corresponding to the second request from the second memory device; and transmit the data based on a bitmask that is updated depending on whether the duplicate address is present, wherein the bitmask comprises one or more bits, each corresponding to the first request and indicating a location corresponding to the first request within an access unit of the second memory device.

19. The electronic device of claim 18, wherein the at least one processor executes the at least one instruction to:

when the duplicate address is present, identify whether a single bit corresponding to the first request is available among the one or more bits; and when the single bit is available, update the single bit, a valid field, and a request identifier that are included in a slot comprising the bitmask.

20. The electronic device of claim 18, wherein the at least one processor executes the at least one instruction to:

identify a dirty bitmask that is provided separately from the bitmask, when the first request requests a write operation; and request a write operation to the second memory device when, among one or more bits included in the dirty bitmask, at least one bit has a specific logic state.

\* \* \* \* \*